United States Patent
Narita et al.

(10) Patent No.: US 11,565,281 B2
(45) Date of Patent: Jan. 31, 2023

(54) METHOD FOR FORMING MULTILAYER COATING FILM

(71) Applicant: KANSAI PAINT CO., LTD., Hyogo (JP)

(72) Inventors: Nobuhiko Narita, Kanagawa (JP); Hirokazu Okazaki, Kanagawa (JP); Tatsuo Kuramochi, Kanagawa (JP); Yuya Hirai, Kanagawa (JP); Takakazu Yamane, Kanagawa (JP); Keiichi Okamoto, Kanagawa (JP); Kouji Teramoto, Kanagawa (JP); Ryuji Nonaka, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 174 days.

(21) Appl. No.: 16/646,718

(22) PCT Filed: Sep. 14, 2018

(86) PCT No.: PCT/JP2018/034242
§ 371 (c)(1),
(2) Date: Mar. 12, 2020

(87) PCT Pub. No.: WO2019/054499
PCT Pub. Date: Mar. 21, 2019

(65) Prior Publication Data
US 2020/0269278 A1 Aug. 27, 2020

(30) Foreign Application Priority Data
Sep. 18, 2017 (JP) .............................. JP2017-178443

(51) Int. Cl.
| | | |
|---|---|---|
| *B05D 5/06* | (2006.01) | |
| *B05D 7/14* | (2006.01) | |
| *B05D 7/00* | (2006.01) | |
| *C09D 5/29* | (2006.01) | |
| *C09D 17/00* | (2006.01) | |

(52) U.S. Cl.
CPC ........... *B05D 7/5723* (2013.01); *B05D 5/068* (2013.01); *C09D 5/29* (2013.01); *C09D 17/001* (2013.01); *C09D 17/005* (2013.01); *C09D 17/006* (2013.01)

(58) Field of Classification Search
CPC .......... B05D 7/572; B05D 7/576; B05D 7/14
See application file for complete search history.

(56) References Cited

U.S. PATENT DOCUMENTS

| | | | |
|---|---|---|---|
| 4,719,132 A | 1/1988 | Porter et al. | |
| 8,034,877 B2 * | 10/2011 | Adachi | .............. C08G 18/4263 525/162 |
| 2004/0028823 A1 | 2/2004 | Dutt | |
| 2009/0226728 A1 * | 9/2009 | Onoe | ........................ C09D 5/02 524/505 |
| 2011/0195180 A1 | 8/2011 | Richter et al. | |
| 2015/0218405 A1 * | 8/2015 | Iwata | ................... C08G 18/227 428/423.1 |
| 2016/0288164 A1 * | 10/2016 | Sato | ........................ B05D 7/576 |
| 2017/0218206 A1 | 8/2017 | Yamane et al. | |
| 2018/0193878 A1 | 7/2018 | Yamane et al. | |
| 2018/0194111 A1 | 7/2018 | Yamane et al. | |
| 2018/0214912 A1 * | 8/2018 | Itoh | ......................... B05D 7/57 |

FOREIGN PATENT DOCUMENTS

| | | |
|---|---|---|
| EP | 3 542 910 | 9/2019 |
| JP | 2003-82290 | 3/2003 |
| JP | 2005-137952 | 6/2005 |
| JP | 2006-297183 | 11/2006 |
| JP | 2009-155537 | 7/2009 |
| JP | 2011-127026 | 6/2011 |
| JP | 2016-107427 | 6/2016 |
| JP | 2016-193385 | 11/2016 |
| JP | 2017-19146 | 1/2017 |
| JP | 2017-19147 | 1/2017 |
| WO | 2007/040284 | 4/2007 |
| WO | 2017/022698 | 2/2017 |
| WO | 2017/111112 | 6/2017 |

OTHER PUBLICATIONS

International Search Report issued Nov. 27, 2018 in International (PCT) Application No. PCT/JP2018/034242.
Extended European Search Report dated May 20, 2021 in corresponding European Patent Application No. 18855564.3.
Notice of Reasons for Refusal dated Nov. 15, 2022 in Japanese Patent Application No. 2019-542319, with English-language translation.

* cited by examiner

*Primary Examiner* — Dah-Wei D. Yuan
*Assistant Examiner* — Kristen A Dagenais-Englehart
(74) *Attorney, Agent, or Firm* — Wenderoth, Lind & Ponack, L.L.P.

(57) ABSTRACT

A method for forming a multilayer coating film comprising the steps of: (1) applying a base paint (X) to a substrate to form a base coating film, (2) applying an effect pigment dispersion (Y) to the base coating film formed in step (1) to form an effect coating film, (3) applying a clear paint (Z) to the effect coating film formed in step (2) to form a clear coating film, and (4) heating the uncured base coating film, the uncured effect coating film, and the uncured clear coating film formed in steps (1) to (3) to thereby simultaneously cure these three coating films; wherein the effect pigment dispersion (Y) contains water, a black pigment (A), a vapor deposition metal flake pigment (B), and a rheology control agent (C).

15 Claims, No Drawings

METHOD FOR FORMING MULTILAYER COATING FILM

TECHNICAL FIELD

The present invention relates to a method for forming a multilayer coating film.

BACKGROUND ART

The purpose of applying paints is mainly to protect materials and impart an excellent appearance. For industrial products, excellent appearance, particularly "texture," is important in terms of enhancing their product power.

Conventionally, there has been a texture called "gunmetal." This is a black iron color with a gun-like metallic luster (PTL 1).

Metallic luster is a texture characterized in that the surface has no graininess, like a mirror-finished surface, in that the coated plate looks shiny when viewed near the specular reflection light with respect to the coated plate (highlight), and in that, conversely, the coated plate looks dark when viewed obliquely to the coated plate (bottom). That is, there is a large luminance difference between the highlight region and the bottom region.

Among designs in black iron color with metallic luster, those having very high lightness in the highlight and showing sharply lowered lightness when the coating surface is only slightly inclined have a sharp lightness change and are considered to be attractive. Such designs have recently been demanded.

However, the gunmetal texture has low lightness in the highlight and lacks a sharp lightness change.

PTL 2 discloses an aqueous base paint composition comprising an effect pigment composed of metal flakes obtained by crushing a vapor deposition metal film, and an aqueous cellulose derivative having an acid value of 20 to 150 mgKOH/g (solids content), wherein the aqueous cellulose derivative serves as a main binder resin, and the content of the effect pigment is 20 to 70 mass % as PWC.

However, a coating film formed with the paint described in PTL 2 had low lightness as a whole and insufficient metallic luster, and lacked a sharp lightness change. Further, there is a cost problem because a binder resin is essentially used.

PTL 3 discloses a multilayer coating film comprising a colored ground layer formed directly or indirectly on a surface of a substrate and containing a coloring material, and an effect material-containing layer containing a flaky effect material and a coloring material, and laminated on the colored ground layer, wherein the colored ground layer has a surface smoothness Wd, as measured by Wave Scan DOI (trade name, produced by BYK-Gardner), of 8 or less, the effect material-containing layer has a thickness of 1.5 μm or more and 6 μm or less, and when the entirety of the effect material present in the effect material-containing layer is projected on the surface of the effect material-containing layer, the occupancy rate of an area occupied by a part where the effect material is projected on the surface is 30% or more and 90% or less.

However, the multilayer coating film of PTL 3 had noticeable graininess and insufficient metallic luster, in terms of lacking a sharp lightness change.

CITATION LIST

Patent Literature

PTL 1: JP2011-127026A
PTL 2: JP2009-155537A
PTL 3: JP2017-19147A

SUMMARY OF INVENTION

Technical Problem

There have been demands for coating films having a design closer to real metal, that is, coating films having all of smooth metallic luster (i.e., less graininess of the coating film to be obtained), sharp brilliance, and shadow (i.e., higher flip-flop property of the coating film to be obtained), compared with conventional coating films.

An object of the present invention is to provide a method for forming a multilayer coating film, whereby a metal feeling coating film in black iron color with a sharp lightness change and excellent metallic luster can be formed.

Solution to Problem

A first aspect of the present invention provides a method for forming a multilayer coating film comprising the steps of:

(1) applying a base paint (X) to a substrate to form a base coating film, (2) applying an effect pigment dispersion (Y) to the base coating film formed in step (1) to form an effect coating film, (3) applying a clear paint (Z) to the effect coating film formed in step (2) to form a clear coating film, and (4) heating the uncured base coating film, the uncured effect coating film, and the uncured clear coating film formed in steps (1) to (3) to thereby simultaneously cure these three coating films;

wherein the effect pigment dispersion (Y) contains water, a black pigment (A), a vapor deposition metal flake pigment (B), and a rheology control agent (C).

Further, a second aspect of the present invention provides a method for forming a multilayer coating film comprising the steps of:

(5) applying a base paint (X) to a substrate to form a base coating film, (6) applying an effect pigment dispersion (Y) to the base coating film formed in step (5) to form an effect coating film, (7) applying a black transparent paint (W) to the effect coating film formed in step (6) to form a black transparent coating film, (8) applying a clear paint (Z) to the black transparent coating film formed in step (7) to form a clear coating film, and (9) heating the uncured base coating film, the uncured effect coating film, the uncured black transparent coating film, and the uncured clear coating film formed in steps (5) to (8) to thereby simultaneously cure these four coating films;

wherein the effect pigment dispersion (Y) contains water, a black pigment (A), a vapor deposition metal flake pigment (B), and a rheology control agent (C), and the black transparent paint (W) contains a black pigment (P).

Moreover, a third aspect of the present invention provides a method fox forming a multilayer coating film comprising the steps of:

(10) applying a base paint (X) to a substrate to form a base coating film,

(11) applying an effect pigment dispersion (Y) to the base coating film formed in step (10) to form an effect coating film,

(12) applying a clear paint (Z) to the effect coating film formed in step (11) to form a clear coating film, followed by heating,

(13) applying a black transparent paint (W) to the coating film formed in step (12) to form a black transparent coating film, and

(14) applying a clear paint (Z) to the black transparent coating film formed in step (13) to form a clear coating film, followed by heating;

wherein the effect pigment dispersion (Y) contains water, a black pigment (A), a vapor deposition metal flake pigment (B), and a rheology control agent (C), and the black transparent paint (W) contains a black pigment (P).

Advantageous Effects of Invention

According to the method for forming a multilayer coating film of the present invention, a coating film having a black iron color appearance with a sharp lightness change and excellent metallic luster is obtained.

DESCRIPTION OF EMBODIMENTS

1. First Aspect

The first aspect of the present invention is described.

The first aspect of present invention is a method for forming a multilayer coating film comprising the steps of:

(1) applying a base paint (X) to a substrate to form a base coating film, (2) applying an effect pigment dispersion (Y) to the base coating film formed in step (1) to form an effect coating film, (3) applying a clear paint (Z) to the effect coating film formed in step (2) to form a clear coating film, and (4) heating the uncured base coating film, the uncured effect coating film, and the uncured clear coating film formed in steps (1) to (3) to thereby simultaneously cure these three coating films;

wherein the effect pigment dispersion (Y) contains water, a black pigment (A), a vapor deposition metal flake pigment (B), and a rheology control agent (C).

1-1. Step (1)

Step (1) is to apply a base paint (X) to a substrate to form a base coating film.

Substrate

Examples of the substrate used in the method for forming a multilayer coating film of the present invention include metal materials, such as metals (e.g., iron, zinc, and aluminum) and alloys containing these metals; molded products of these metals; molded products of glass, plastic, and foamed articles; films; and the like. These materials can be suitably subjected to degreasing treatment or surface treatment to obtain substrates. Examples of the surface treatment include phosphate treatment, chromate treatment, composite oxide treatment, and the like. Further, when the material of the substrate is metal, a cationic electrodeposition coating film is preferably formed on a surface-treated metal material using a cationic electrodeposition paint. An intermediate coating film may be formed on the cationic electrodeposition coating film. The intermediate coating film is preferably colored, in terms of undercoat hiding power, weather resistance, and the like. In particularly, when a base paint (X), described later, is transparent, it is preferable to form a colored intermediate coating film, in terms of undercoat hiding power, weather resistance, and the like.

Moreover, when the material of the substrate is plastic, a primer coating film is preferably formed on a degreased plastic material using a primer paint.

Base Paint (X)

As the base paint (X), a thermosetting paint mainly comprising a solvent and a thermosetting resin can be specifically used. Such thermosetting paints are known. The thermosetting paints may include a so-called intermediate paint. The base paint (X) may be transparent or colored.

Examples of the solvent used in the base paint (X) include organic solvents and/or water.

As the thermosetting resin used in the base paint (X), it is preferable to use a base resin and a crosslinking agent in combination, in terms of water resistance, chemical resistance, weather resistance, and the like.

The base resin is preferably a resin that has excellent weather resistance, transparency, and the like. Specific examples include acrylic resins, polyester resins, epoxy resins, urethane resins, and the like.

Examples of acrylic resins include resins obtained by copolymerizing (meth)acrylic acid esters having a functional group, such as a carboxyl group, a hydroxyl group, an amide group, or a methylol group, other (meth)acrylic-acid esters, styrene, and the like.

Usable examples of polyester resins include those obtained by the condensation reaction of polybasic acid, polyhydric alcohol, and optionally denatured oil by a conventional method.

Examples of epoxy resins include an epoxy resin obtained by a method in which an epoxy ester is synthesized by the reaction of an epoxy group and an unsaturated fatty acid, and an α,β-unsaturated acid is added to this unsaturated group; an epoxy ester resin obtained by a method in which the hydroxyl group of epoxy ester and a polybasic acid, such as phthalic acid or trimellitic acid, are esterified; and the like.

Examples of urethane resins include those obtained by reacting an acrylic resin, a polyester resin, or an epoxy resin mentioned above with a diisocyanate compound to increase their molecular weight.

The base paint (X) may be an aqueous paint or a solvent-based paint. However, in terms of reducing the VOC of the paint, the colored paint (X) is preferably an aqueous paint. When the base paint (X) is an aqueous paint, the base resin can be made soluble in water or dispersed in water by using a resin containing a hydrophilic group, such as a carboxyl group, a hydroxyl group, a methylol group, an amino group, a sulfonic acid group, or a polyoxyethylene bond, most generally a carboxyl group, in an amount sufficient for making the resin soluble in water or dispersed in water, and neutralizing the hydrophilic group to form an alkali salt. The amount of the hydrophilic group (e.g., a carboxyl group) used in this case is not particularly limited, and can be suitably selected depending on the degree of water solubilization or water dispersion. However, the amount of the hydrophilic group is generally such that the acid value is about 10 mgKOH/g or more, and preferably 30 to 200 mgKOH/g. Examples of the alkaline substance used in neutralization include sodium hydroxide, amine compounds, and the like.

Moreover, dispersion of the above resin in water can be performed by emulsion polymerization of the monomer components in the presence of a surfactant and a water-soluble resin. Furthermore, the water dispersion can also be obtained by, for example, dispersing the above resin in water in the presence of an emulsifier. In the water dispersion, the base resin may not contain the above hydrophilic group at all, or may contain the above hydrophilic group in an amount less than the water-soluble resin.

The crosslinking agent is a component used to crosslink and cure the base resin by heating. Examples include amino resins, polyisocyanate compounds, blocked polyisocyanate compounds, epoxy-containing compounds, carboxy-containing compounds, carbodiimide group-containing compounds, hydrazide group-containing compounds, semicarbazide group-containing compounds, and the like. Preferable among these are amino resins reactive with a hydroxyl group, polyisocyanate compounds, blocked polyisocyanate compounds, and carbodiimide group-containing compounds reactive with a carboxyl group. As the polyisocyanate compound and blocked polyisocyanate compound, those described later in the "Clear Paint (Z)" section can be used. These crosslinking agents can be used singly or in a combination of two or more.

Specifically, amino resins obtained by condensation or co-condensation of formaldehyde with melamine, benzoguanamine, urea, or the like, or further etherification with a lower monohydric alcohol, are suitably used. Further, a polyisocyanate compound or a blocked polyisocyanate compound can also be suitably used.

The ratio of each component in the base paint (X) may be freely selected as required. However, in terms of water resistance, appearance, and the like, it is generally preferable that the ratio of the base resin is 60 to 90 mass %, and particularly 70 to 85 mass %, based on the total mass of both components; and that the ratio of the crosslinking agent is 10 to 40 mass %, and particularly 15 to 30 mass %, based on the total mass of both components.

The base paint (X) can contain a pigment, if necessary. When the base paint (X) is transparent, a pigment is contained in an amount that does not impair the transparency of the base paint (X).

When the base paint (X) is colored, the type and amount of pigment is preferably adjusted so that the coating film to be obtained is adjusted to have a lightness L* value in the L*a*b* color space of 0.1 to 80, more preferably 0.1 to 70, and even more preferably 0.1 to 60, when light illuminated at an angle of 45 degrees with respect to the coating film is received at an angle of 45 degrees deviated from the specular reflection light, in terms of undercoat hiding power. "Lightness L*" refers to a numerical value showing lightness in the L*a*b* color space, which was standardized in 1976 by the Commission Internationale de l'Eclairage, and which is also adopted in JIS Z 8729 in Japan. Specifically, it can be defined as a numerical value measured using a multi angles spectrophotometer MA-68II (trade name, produced by X-Rite).

Examples of the pigment include metallic pigments, rust preventive pigments, color pigments, extender pigments, and the like. Among these, color pigments are preferably used. In terms of obtaining a coating film with excellent undercoat hiding power and metallic luster, black pigments are more preferably used.

The pigment can be used in a suitable combination, depending on light transmittance, undercoat hiding power, desired color tone, and the like. The amount thereof used is suitably such that the cured coating film formed with the base paint (X) has a light transmittance of 10% or less, and preferably 5% or less, at a wavelength of 400 to 700 nm, in terms of undercoat hiding power, weather resistance, and the like.

The light transmittance of the coating film is the spectral transmittance of the coating film as a sample measured by an automatic spectrophotometer (Model EPS-3T, produced by Hitachi, Ltd.) at a wavelength of 400 to 700 nm. The coating film is obtained by applying a paint to a glass plate to a specific film thickness when cured, curing the paint, then immersing the resultant in warm water at 60 to 70° C., and peeling the coating film, followed by drying. When there is a difference depending on the measured wavelength (400 to 700 nm), the maximum value is used as light transmittance.

An organic solvent can also be used for the base paint (X), if necessary. Specifically, organic solvents generally used for paints can be used. Examples of organic solvents include hydrocarbons, such as toluene, xylene, hexane, and heptane; esters, such as ethyl acetate, butyl acetate, ethylene glycol monomethyl ether acetate, diethylene glycol monoethyl ether acetate, and diethylene glycol monobutyl acetate; ethers, such as ethylene glycol monomethyl ether, ethylene glycol diethyl ether, diethylene glycol monomethyl ether, and diethylene glycol dibutyl ether; alcohols, such as butanol, propanol, octanol, cyclohexanol, and diethylene glycol; ketones, such as methyl ethyl ketone, methyl isobutyl ketone, cyclohexanone, and isophorone; and other organic solvents. These can be used singly or in a combination of two or more.

Among the above, organic solvents such as esters, ethers, alcohols, and ketones are preferable, in terms of solubility.

The cured film thickness of the base coating film obtained using the base paint (X) is 15 μm or more, preferably 15 to 30 μm, and more preferably 15 to 25 μm, in terms of light transmittance, undercoat hiding power, metallic luster, and the like.

Coating of the base paint (X) can be performed by a general method. When the base paint (X) is an aqueous paint, for example, deionized water, and optionally additives, such as a thickener and an antifoaming agent, are added to the base paint (X) to adjust the solids content and viscosity within the following ranges, followed by coating to the substrate surface by spray coating, rotary atomization coating, or the like. An electrostatic charge may be applied, if necessary, during coating.

The solids content of the base paint (X) in this case is about 10 to 60 mass %, and the viscosity thereof at a temperature of 20° C. measured by a Brookfield type viscometer at 6 rpm after 1 minute is 200 to 5000 mPa·s. The Brookfield type viscometer used in the present specification is "LVDV-I" (trade name, produced by Brookfield).

When the base paint (X) is colored, the monochrome hiding film thickness of the base paint (X) is preferably 40 μm or less, more preferably 5 to 35 μm, and even more preferably 10 to 30 μm, in terms of color stability and the like. In the present specification, the "monochrome hiding film thickness" is a value obtained in the following manner. The monochrome checkered hiding power test paper specified in 4.1.2 of JIS K5600-4-1 is attached to a steel plate. Then, the paint is applied by inclined coating so that the film thickness continuously varies, and the paint is dried or cured. The coating surface is then visually observed under diffused daylight, and the minimum film thickness in which the monochrome border of the checker of the hiding power test paper disappears is measured by an electromagnetic film thickness meter. The measured value is the "monochrome hiding film thickness."

1-2. Step (2)

Step (2) is to apply an effect pigment dispersion (Y) to the base coating film formed in step (1) to form an effect coating film.

Effect Pigment Dispersion (Y)

The effect pigment dispersion (Y) contains water, a black pigment (A), a vapor deposition metal flake pigment (B), and a rheology control agent (C).

Black Pigment (A)

As the black pigment (A), for example, conventionally known pigments for ink, paints, or plastic coloring can be used singly or in a combination of two or more. Examples of the black pigment (A) include composite metal oxide pigments, black iron oxide pigments, black titanium oxide pigments, perylene black pigments, carbon black pigments, and the like; however, in terms of obtaining a multilayer coating film in black iron color, carbon black pigments are preferable. Among these, carbon black pigments having a primary particle size of 3 to 20 nm are particularly preferable, and carbon black pigments having a primary particle size of 5 to 15 nm are more preferable. Specific examples include, but are not limited to, commercial products, such as Monarch 1300 (trade name, produced by Cabot, primary particle size: 13 nm) and Raven 5000 (trade name, produced by Birla Carbon, primary particle size: 11 nm). The black pigments (A) can be used singly or in a combination of two or more, depending on the desired color tone.

The effect pigment dispersion (Y) may preferably contain 0.1 to 50 parts by mass, more preferably 1 to 35 parts by mass, and particularly preferably 4 to 25 parts by mass, of the black pigment (A), based on 100 parts by mass (solids content) of the effect pigment dispersion, in terms of obtaining a multilayer coating film in black iron color with hiding power.

Vapor Deposition Metal Flake Pigment (B)

The vapor deposition metal flake pigment (B) is obtained by vapor-depositing a metal film on a base material, removing the base material, and then grinding the vapor deposition metal film. Examples of the base material include films and the like.

The material of the above metal is not particularly limited. Examples include aluminum, gold, silver, copper, brass, titanium, chromium, nickel, nickel chromium, stainless steel, and the like. Of these, aluminum or chromium is particularly preferable, in terms of easy availability, ease of handling, and the like. In the present specification, a vapor deposition metal flake pigment obtained by vapor deposition of aluminum refers to a "vapor deposition aluminum flake pigment," and a vapor deposition metal flake pigment obtained by vapor deposition of chromium refers to a "vapor deposition chromium flake pigment."

Examples of commercial products that can be used as the vapor deposition aluminum flake pigment include "Hydroshine WS" series (trade name, produced by Eckart), "Decomet" series (trade name, produced by Schlenk), "Metasheen" series (trade name, produced by BASF), and the like.

Examples of commercial products that can be used as the vapor deposition chromium flake pigment include "Metalure Liquid Black" series (trade name, produced by Eckart) and the like.

The average primary particle size (D50) of the vapor deposition metal flake pigment is preferably about 1 to 50 μm, and more preferably about 5 to 20 μm, in terms of the storage stability in the paint, and the blackness, appearance, and the like, of the coating film to be formed.

The average thickness of the vapor deposition metal flake pigment is preferably 0.01 to 1.0 μm, and more preferably 0.01 to 0.1 μm.

When a vapor deposition aluminum flake pigment is used as the vapor deposition metal flake pigment, the surface of the vapor deposition aluminum flake pigment is preferably treated with silica, in terms of obtaining a coating film with excellent storage stability and metallic luster.

Regarding the mixing ratio of the black pigment (A) and the vapor deposition metal flake pigment (B), the solids content of the black pigment (A) is 0.1 to 10 parts by mass, preferably 0.3 to 7.5 parts by mass, and more preferably 0.25 to 5 parts by mass, based on 1 part by mass of the vapor deposition metal flake pigment (B), in terms of obtaining a metal feeling coating film in black iron color with a sharp lightness change and excellent metallic luster.

The effect pigment dispersion (Y) can contain 0.2 to 50 parts by mass, preferably 1 to 25 parts by mass, and more preferably 2 to 15 parts by mass, of the vapor deposition metal flake pigment (B) based on 100 parts by mass (solids content) of the effect pigment dispersion, in terms of obtaining a multilayer coating film with metallic luster.

Rheology Control Agent (C)

As the rheology control agent (C) in the effect pigment dispersion (Y), a known rheology control agent can be used. Examples include silica-based fine powder, mineral-based rheology control agents, barium sulfate atomization powder, polyamide-based rheology control agents, organic resin fine particle rheology control agents, diurea-based rheology control agents, urethane association-type rheology control agents, polyacrylic acid-based rheology control agents, which are acrylic swelling-type, cellulose-based rheology control agents, and the like. Of these, particularly in terms of obtaining a coating film with excellent metallic luster, it is preferable to use a mineral-based rheology control agent, a polyacrylic acid-based rheology control agent, or a cellulose-based rheology control agent.

Examples of mineral-based rheology control agents include swelling laminar silicate that has a 2:1 type crystal structure. Specific examples include smectite group clay minerals, such as natural or synthetic montmorillonite, saponite, hectorite, stevensite, beidellite, nontronite, bentonite, and laponite; swelling mica group clay minerals, such as Na-type tetrasilicic fluorine mica, Li-type tetrasilicic fluorine mica, Na salt-type fluorine taeniolite, and Li-type fluorine taeniolite; vermiculite; substitution products or derivatives thereof; and mixtures thereof.

Examples of polyacrylic acid-based rheology control agents include sodium polyacrylate, polyacrylic acid-(meth) acrylic acid ester copolymers, and the like.

The active ingredient acid value of the polyacrylic acid-based rheology control agent can be set within the range of 30 to 300 mgKOH/g, and preferably 80 to 280 mgKOH/g. Examples of commercial products of the polyacrylic acid-based rheology control agent include "Primal ASE-60," "Primal TT615," and "Primal RM5" (trade names, produced by The Dow Chemical Company); "SN Thickener 613," "SN Thickener 618," "SN Thickener 630," "SN Thickener 634," and "SN Thickener 636" (trade names, produced by San Nopco Limited); and the like.

Examples of cellulose-based rheology control agents include carboxymethylcellulose, methylcellulose, hydroxyethylcellulose, hydroxyethylmethylcellulose, hydroxypropylmethylcellulose, cellulose nanofibers, and the like. Of these, cellulose nanofibers are particularly preferably used, in terms of obtaining a coating film with excellent metallic luster.

The cellulose nanofibers may also be referred to as cellulose nanofibrils, fibrillated cellulose, or nanocellulose crystals.

The cellulose nanofibers have a number average fiber diameter within the range of preferably 2 to 500 nm, more preferably 2 to 250 nm, even more preferably 2 to 150 nm, in terms of obtaining a coating film with excellent metallic luster. The cellulose nanofibers also have a number average fiber length within the range of preferably 0.1 to 20 μm, more preferably 0.1 to 15 μm, even more preferably 0.1 to 10 μm. The aspect ratio determined by dividing a number average fiber length by a number average fiber diameter is within the range of preferably 50 to 10000, more preferably 50 to 5000, and even more preferably 50 to 1000.

The number average fiber diameter and number average fiber length are measured and calculated from, for example, an image obtained by subjecting a sample (cellulose nanofibers diluted with water) to a dispersion treatment, casting the sample on a grid coated with a carbon film that has been subjected to hydrophilic treatment, and observing the sample with a transmission electron microscope (TEM).

The cellulose nanofibers for use may be those obtained by defibrating a cellulose material and stabilizing it in water.

Examples of commercial products of cellulose nanofibers include Rheocrysta (registered trademark) produced by DKS Co. Ltd., and the like. In the present invention, for example, cellulose nanofibers prepared in the following manner can be used.

The above cellulose nanofibers can be produced, for example, as follows.

The cellulose material as used here refers to cellulose-main materials in various forms. Specific examples include pulp (e.g., grass plant-derived pulp, such as wood pulp, jute, Manila hemp, and kenaf); natural cellulose, such as cellulose produced by microorganisms; regenerated cellulose obtained by dissolving cellulose in a copper ammonia solution, a solvent of a morpholine derivative, or the like, and subjecting the dissolved cellulose to spinning; and fine cellulose obtained by subjecting the cellulose material to mechanical treatment, such as hydrolysis, alkali hydrolysis, enzymatic decomposition, blasting treatment, vibration ball milling, and the like, to depolymerize the cellulose.

The method for defibrating the cellulose material is not particularly limited, as long as the cellulose material remains in a fibrous form. Examples of the method include mechanical defibration treatment using a homogenizer, a grinder, and the like; chemical treatment using an oxidation catalyst and the like; and biological treatment using microorganisms and the like.

For the cellulose nanofibers, anionically modified cellulose nanofibers can be used. Examples of anionically modified cellulose nanofibers include carboxylated cellulose nanofibers, carboxymethylated cellulose nanofibers, phosphate group-containing cellulose nanofibers, and the like. The anionically modified cellulose nanofibers can be obtained, for example, by incorporating functional groups such as carboxyl groups, carboxymethyl groups, and phosphate groups into a cellulose material by a known method, washing the obtained modified cellulose to prepare a dispersion of the modified cellulose, and defibrating this dispersion. The carboxylated cellulose is also referred to as oxidized cellulose.

The oxidized cellulose is obtained, for example, by oxidizing the cellulose material in water using an oxidizing agent in the presence of a compound selected from the group consisting of N-oxyl compounds, bromide, iodide, and mixtures thereof.

The amount of an N-oxyl compound is not particularly limited, as long as the amount is a catalytic amount that can disintegrate cellulose into nanofibers. The amount of bromide or iodide can be suitably selected within the range in which an oxidation reaction is promoted.

For the oxidizing agent, a known oxidizing agent may be used. Examples include halogen, hypohalous acid, halous acid, perhalogenic acid, salts thereof, halogen oxide, peroxide, and the like. It is preferable to set the conditions so that the amount of carboxyl groups in oxidized cellulose is 0.2 mmol/g or more based on the solids content mass of the oxidized cellulose. The amount of carboxyl groups can be adjusted, for example, by performing the following: adjustment of oxidation reaction time; adjustment of oxidation reaction temperature; adjustment of pH in oxidation reaction; and adjustment of the amount of an N-oxyl compound, bromide, iodide, oxidizing agent, or the like.

Carboxymethyl groups can be introduced in the following manner.

The cellulose material and a solvent are mixed, and mercerization treatment is performed using 0.5 to 20-fold moles of alkali hydroxide metal per glucose residue of the cellulose material as a mercerization agent at a reaction temperature of 0 to 70° C. for a reaction time of about 15 minutes to 8 hours. Thereafter, 0.05 to 10.0-fold moles of a carboxymethylating agent per glucose residue is added thereto, followed by reaction at a reaction temperature of 30 to 90° C. for a reaction time of about 30 minutes to 10 hours, whereby carboxymethyl groups can be introduced into the hydroxyl groups of the cellulose molecule.

The degree of substitution of carboxymethyl per glucose unit in the modified cellulose obtained by introducing carboxymethyl groups into the cellulose material is preferably 0.02 to 0.50.

The thus-obtained modified cellulose can be dispersed in an aqueous solvent to form a dispersion, and the dispersion can be then defibrated using a grinder. The grinder to be used may be any of the following: a high-speed shearing grinder, a collider grinder, a bead mill grinder, a high-speed rotating grinder, a colloid mill grinder, a high-pressure grinder, a roll mill grinder, and an ultrasonic grinder. These grinders may be used in a combination of two or more. Among these, a high-speed shearing defibrating apparatus, a collider defibrating apparatus, and a high-speed rotating defibrating apparatus are preferably used, because higher shear force can be applied under conditions with less risk of contamination by media.

The cellulose-based rheology control agent in the effect pigment dispersion (Y) is preferably contained in an amount of 2 to 150 parts by mass, more preferably 3 to 120 parts by mass, and particularly preferably 4 to 100 parts by mass, based on 100 parts by mass of the vapor deposition metal flake pigment (B), in terms of obtaining a coating film with excellent metallic luster.

These rheology control agents can be used singly or in a combination of two or more.

The content of the rheology control agent (C) in the effect pigment dispersion (Y) as a solids content is preferably 0.1 to 50 parts by mass, more preferably 1 to 35 parts by mass, and particularly preferably 5 to 25 parts by mass, based on 100 parts by mass of the effect pigment dispersion, in terms of obtaining a multilayer coating film with metallic luster.

The effect pigment dispersion (Y) preferably further contains a surface adjusting agent. The surface adjusting agent is used to facilitate uniform orientation of the vapor deposition metal flake pigment (B) dispersed in water on the substrate when the effect pigment dispersion is applied to the substrate. If the vapor deposition metal flake pigment (B) can be uniformly oriented on the substrate, a multilayer coating film with excellent metallic luster and a sharp lightness change can be obtained.

The surface adjusting agent has a contact angle of preferably 8 to 20°, more preferably 9 to 19°, and even more preferably 10 to 18°, with respect to a previously degreased tin plate (produced by Paltek Corporation), the contact angle being measured in such a manner that a liquid that is a mixture of isopropanol, water, and the surface adjusting agent at a ratio of 4.5/95/1 is adjusted to have a viscosity of 150 mPa·s measured by a Brookfield type viscometer at a rotor rotational speed of 60 rpm at a temperature of 20° C., 10 μL of the liquid is added dropwise to the tin plate, and the contact angle with respect to the tin plate is measured 10 seconds after dropping. In this case, the viscosity is controlled by using a rheology control agent "ASE-60" (a polyacrylic acid-based rheology control agent, produced by The Dow Chemical Company, solids content: 28%).

The 4.5/95/1 ratio, which is the mass ratio of isopropanol/water/surface adjusting agent, corresponds to the component ratio of the effect pigment dispersion (Y) for evaluating the surface adjusting agent. The 150 mPa·s viscosity measured by a Brookfield type viscometer at a rotor rotational speed of 60 rpm is a normal value during coating to a substrate. Moreover, the 8 to 20° contact angle with respect to the tin plate represents the wet spreading of liquid under standard coating conditions. When the contact angle is 8° or more, the liquid is applied to a substrate without being overly spread; whereas when the contact angle is 20° or less, the liquid is uniformly applied to a substrate without being overly repelled.

Examples of the surface adjusting agent include silicone-based surface adjusting agents, acrylic-based surface adjusting agents, vinyl-based surface adjusting agents, and fluorine-based surface adjusting agents. These surface adjusting agents can be used singly or in a combination of two or more.

Examples of commercial products of the surface adjusting agent include BYK series (produced by BYK-Chemie), Tego series (produced by Evonik), Glanol series and Polyflow series (produced by Kyoeisha Chemical Co., Ltd.), DISPARLON series (produced by Kusumoto Chemicals, Ltd.), and the like.

The surface adjusting agent is preferably a silicone-based surface adjusting agent, particularly in terms of the metallic luster, water resistance, and the like, of the coating film to be obtained. Usable silicone-based surface adjusting agents include polydimethylsiloxane and modified silicone obtained by modifying polydimethylsiloxane. Examples of modified silicone include polyether-modified silicone, acrylic-modified silicone, polyester-modified silicone, and the like.

The dynamic surface tension of the surface adjusting agent is preferably 50 to 70 mN/m, more preferably 53 to 68 mN/m, and even more preferably 55 to 65 mN/m. In the present specification, the "dynamic surface tension" refers to a surface tension value measured by the maximum bubble pressure method at a frequency of 10 Hz. The dynamic surface tension was measured using a SITA measuring apparatus (SITA t60, produced by EKO Instruments).

Moreover, the static surface tension of the surface adjusting agent is preferably 15 to 30 mN/m, more preferably 18 to 27 mN/m, and even more preferably 20 to 24 mN/m. The static surface tension was measured using a surface tensiometer (DCAT 21, produced by EKO Instruments).

Furthermore, the lamellar length of the surface adjusting agent is preferably 6.0 to 9.0 mm, more preferably 6.5 to 8.5 mm, and even more preferably 7.0 to 8.0 mm.

When the effect pigment dispersion (Y) contains a surface adjusting agent, the content thereof can be 1 to 50 parts by mass, preferably 5 to 45 parts by mass, and more preferably 8 to 40 parts by mass, based on 100 parts by mass (solids content) of the effect pigment dispersion, in terms of obtaining a multilayer coating film with metallic luster.

The effect pigment dispersion (Y) may further suitably contain, if necessary, an organic solvent, a color pigment other than the black pigment (A), an effect pigment other than the vapor deposition metal flake pigment (B), an extender pigment, a pigment dispersant, an antisettling agent, an antifoaming agent, an ultraviolet absorber, and the like.

Examples of color pigments other than the black pigment (A) include titanium white, zinc molybdate, calcium molybdate, berlin blue, ultramarine blue, cobalt blue, copper phthalocyanine blue, indanthrone blue, chrome yellow, synthetic yellow iron oxide, bismuth vanadate, titanium yellow, zinc yellow, monoazo yellow, ochre, disazo, isoindolinone yellow, metallic complex azo yellow, quinophthalone yellow, benzimidazolone yellow, rouge, monoazo red, unsubstituted quinacridone red, azo-lake (Mn salt), quinacridone magenta, anthanthrone orange, dianthraquinonyl red, perylene maroon, quinacridone magenta, perylene red, diketo pyrrolo-pyrrole chrome vermilion, chlorinated phthalocyanine green, brominated phthalocyanine green, pyrazolone orange, benzimidazolone orange, dioxazine violet, perylene violet, and the like.

Examples of effect pigments other than the vapor deposition metal flake pigment (B) include metal flake pigments, such as aluminum flake pigments and colored aluminum flake pigments; interference pigments; and the like.

Aluminum flake pigments are produced by grinding or milling aluminum.

Colored aluminum flake pigments are obtained by attaching color pigments to the surface of aluminum flakes of aluminum flake pigments.

Specific examples of interference pigments include metal oxide-coated mica pigments, metal oxide-coated alumina flake pigments, metal oxide-coated glass flake pigments, metal oxide-coated silica flake pigments, and the like.

Examples of the extender pigment include barium sulfate, barium carbonate, calcium carbonate, aluminum silicate, silica, magnesium carbonate, talc, alumina white, and the like.

The effect pigment dispersion (Y) may contain a base resin and a crosslinking agent, in terms of the adhesion of the coating film to be obtained. However, the effects of the present invention can be exhibited even if these are not substantially contained.

Examples of the base resin include acrylic resins, polyester resins, alkyd resins, urethane resins, and the like.

Examples of the crosslinking agent include melamine resins, melamine resin derivatives, urea resins, (meth)acrylamide, polyaziridine, polycarbodiimide, blocked or unblocked polyisocyanate compounds, and the like. These may be used singly or in a combination of two or more.

Amount of Each Component Mixed in Effect Pigment Dispersion (Y)

The effect pigment dispersion (Y) contains water, a black pigment (A), a vapor deposition metal flake pigment (B), and a rheology control agent (C). The amount of each component mixed in the effect pigment dispersion (Y) is preferably within the following range, in terms of obtaining a coating film with excellent metallic luster.

Based on 100 parts by mass of the total amount of water, the black pigment (A), the vapor deposition metal flake pigment (B), and the rheology control agent (C), water: preferably 70 to 99 parts by mass, more preferably 80 to 99 parts by mass, and even more preferably 85 to 99 parts by mass;

black pigment (A): preferably 0.01 to 20 parts by mass, more preferably 0.1 to 10 parts by mass, and even more preferably 0.5 to 12 parts by mass (solids content mass);

vapor deposition metal flake pigment (B): preferably 0.01 to 10 parts by mass, more preferably 0.1 to 5 parts by mass, and even more preferably 0.3 to 4 parts by mass (solids content mass); and rheology control agent (C): preferably 0.1 to 30 parts by mass, more preferably 0.5 to 10 parts by mass, and even more preferably 0.5 to 3 parts by mass (solids content mass).

When the effect pigment dispersion (Y) contains a base resin and/or a crosslinking agent, the amount of each component mixed in the effect pigment dispersion (Y) is preferably within the following range, in terms of obtaining a coating film with excellent metallic luster.

Based on 100 parts by mass of the resin solids content in the effect pigment dispersion (Y), water: preferably 100 to 10000 parts by mass, more preferably 1000 to 8000 parts by mass, and even more preferably 1300 to 7000 parts by mass;

black pigment (A): preferably 0.1 to 100 parts by mass, more preferably 1 to 80 parts by mass, and even more preferably 10 to 60 parts by mass (solids content mass);

vapor deposition metal flake pigment (B): preferably 0.1 to 500 parts by mass, more preferably 1 to 100 parts by mass, and even more preferably 3 to 50 parts by mass (solids content mass); and rheology control agent (C): preferably 1 to 1000 parts by mass, more preferably 5 to 500 parts by mass, and even more preferably 7 to 100 parts by mass (solids content mass).

When the effect pigment dispersion (Y) contains a base resin and/or a crosslinking agent, and also contains a surface adjusting agent, the content of the surface adjusting agent is preferably 1 to 2000 parts by mass, more preferably 10 to 500 parts by mass, and even more preferably 10 to 150 parts by mass, based on 100 parts by mass of the resin solids content in the effect pigment dispersion (Y), in terms of obtaining a multilayer coating film with metallic luster.

When the effect pigment dispersion (Y) contains a surface adjusting agent, the content of the surface adjusting agent is preferably 0.1 to 10 parts by mass, more preferably 0.5 to 5 parts by mass, and even more preferably 0.8 to 5 parts by mass, based on 100 parts by mass of the total amount of water, the black pigment (A), the vapor deposition metal flake pigment (B), and the rheology control agent (C), in terms of obtaining a multilayer coating film with metallic luster.

The contact angle of the effect pigment dispersion (Y) is 8 to 20°, and preferably 10 to 18°, in terms of obtaining a coating film with excellent metallic luster. The contact angle meter used in this case is CA-X150 (produced by Kyowa Interface Science Co., Ltd.). The viscosity of the effect pigment dispersion (Y) measured by a Brookfield type viscometer at a rotor rotational speed of 60 rpm is adjusted to 150 mPa·s, 10 μL is added dropwise to a previously degreased tin plate (produced by Paltek Corporation), and the viscosity is measured 10 seconds after dropping. The measured value refers to the contact angle.

Coating of Effect Pigment Dispersion (Y)

The effect pigment dispersion (Y) is produced by mixing and dispersing the above components. In terms of obtaining a coating film with excellent metallic luster, the solids content during coating is preferably adjusted to 0.1 to 15 mass %, and more preferably 0.2 to 10 mass %, based on the effect pigment dispersion (Y).

The viscosity of the effect pigment dispersion (Y) at a temperature of 20° C. measured by a Brookfield type viscometer at 60 rpm after 1 minute (also referred to as "the B60 value" in the present specification) is preferably 60 to 1500 mPa·s, more preferably 60 to 1000 mPa·s, and even more preferably 60 to 500 mPa·s, in terms of obtaining a coating film with excellent metallic luster. The viscometer used in this case is a Brookfield type viscometer (trade name: LVDV-I, produced by Brookfield).

The effect pigment dispersion (Y) can be applied by a method such as electrostatic coating, air spray coating, or airless spray coating. In the method for forming a multilayer coating film of the present invention, rotary atomization electrostatic coating is particularly preferable.

It is preferable that the effect coating film obtained by applying the effect pigment dispersion (Y) is dried.

The method of drying the effect coating film is not particularly limited. For example, a method that allows the coating film to stand at ordinary temperature for 15 to 30 minutes, a method that performs preheating at a temperature of 50 to 100° C. for 30 seconds to 10 minutes, or the like, can be used.

The film thickness 30 seconds after the effect pigment dispersion (Y) is attached to the base coating film is preferably 3 to 50 μm, more preferably 4 to 48 μm, and even more preferably 5 to 46 μm, in terms of obtaining a coating film with excellent metallic luster.

The thickness of the effect coating film, as dry film thickness, is preferably 0.02 to 6.5 μm, more preferably 0.04 to 5.0 μm, and even more preferably 0.12 to 5.0 μm.

1-3. Step (3)

Step (3) is to apply a clear paint (Z) to the effect coating film formed in step (2) to form a clear coating film.

Clear Paint (Z)

As the clear paint (Z), any known thermosetting clear-coat paint composition can be used. Examples of the thermosetting clear-coat paint composition include organic solvent-based thermosetting paint compositions containing a base resin having a crosslinkable functional group and a crosslinking agent, aqueous thermosetting paint compositions containing a base resin having a crosslinkable functional group and a crosslinking agent, powder thermosetting paint compositions containing a base resin having a crosslinkable functional group and a crosslinking agent, and the like.

Examples of the crosslinkable functional group in the base resin include carboxyl groups, hydroxyl groups, epoxy groups, silanol groups, and the like. Examples of the type of base resin include acrylic resins, polyester resins, alkyd resins, urethane resins, epoxy resins, fluororesins, and the like. Examples of crosslinking agents include polyisocyanate compounds, blocked polyisocyanate compounds, melamine resins, urea resins, carboxy-containing compounds, carboxy-containing resins, epoxy-containing resins, epoxy-containing compounds, and the like.

Examples of combinations of a base resin and a crosslinking agent in the clear paint (Z) include a carboxy-containing resin and an epoxy-containing resin, a hydroxy-containing resin and a polyisocyanate compound, a hydroxy-containing resin and a blocked polyisocyanate compound, a hydroxy-containing resin and a melamine resin, and the like.

Moreover, the clear paint (Z) may be a one-component paint or a multiple-component paint, such as a two-component urethane resin paint.

In particular, the clear paint (Z) is preferably a two-component clear paint containing a hydroxy-containing resin and an isocyanate group-containing compound, in terms of the adhesion of the coating film to be obtained.

When a two-component clear paint containing a hydroxy-containing resin and an isocyanate group-containing compound is used as the clear paint (Z), the hydroxy-containing resin and the polyisocyanate compound are preferably separated, in terms of storage stability. Both are mixed for preparation immediately before use.

When a one-component paint is used as the clear paint (Z), examples of combinations of a base resin and a crosslinking agent in the one-component paint include a carboxy-containing resin and an epoxy-containing resin, a hydroxy-containing resin and a blocked polyisocyanate compound, a hydroxy-containing resin and a melamine resin, and the like. When a one-component paint is used as the clear paint (Z), the clear paint (Z) preferably contains a self-crosslinkable component in terms of adhesion.

Examples of the self-crosslinkable component include melamine resins, melamine resin derivatives, (meth)acrylamide, polyaziridine, polycarbodiimide, blocked or unblocked polyisocyanate, and the like. These may be used singly or in a combination of two or more.

The clear paint (Z) may further suitably contain one or more additives, such as solvents (e.g., water and organic solvents), curing catalysts, antifoaming agents, and ultraviolet absorbers, if necessary.

Hydroxy-Containing Resin

As the hydroxy-containing resin, conventionally known resins can be used without limitation, as long as they are resins containing a hydroxyl group. Examples of the hydroxy-containing resin include hydroxy-containing acrylic resins, hydroxy-containing polyester resins, hydroxy-containing polyether resins, hydroxy-containing polyurethane resins, and the like; preferably hydroxy-containing acrylic resins and hydroxy-containing polyester resins; and particularly preferably hydroxy-containing acrylic resins.

The hydroxy value of the hydroxy-containing acrylic resin is preferably within the range of 80 to 200 mgKOH/g, and more preferably 100 to 180 mgKOH/g. When the hydroxy value is 80 mgKOH/g or more, the crosslinking density is high, and thus the scratch resistance is sufficient. Further, when the hydroxy value is 200 mgKOH/g or less, the water resistance of the coating film is maintained.

The weight average molecular weight of the hydroxy-containing acrylic resin is preferably within the range of 2500 to 40000, and more preferably 5000 to 30000. When the weight average molecular weight is 2500 or more, the coating film performance, such as acid resistance, is excellent. When the weight average molecular weight is 40000 or less, the smoothness of the coating film is maintained, and thus the appearance is excellent.

In the present specification, the weight average molecular weight refers to a value calculated from a chromatogram measured by gel permeation chromatography based on the molecular weight of standard polystyrene. For the gel permeation chromatography, "HLC8120GPC" (produced by Tosoh Corporation) was used. The measurement was conducted using four columns: "TSKgel G-4000HXL," "TSKgel G-3000HXL," "TSKgel G-2500HXL," and "TSKgel G-2000HXL" (trade names, all produced by Tosoh Corporation) under the following conditions: mobile phase: tetrahydrofuran, measuring temperature: 40° C., flow rate: 1 cc/min, and detector: RI.

The glass transition temperature of the hydroxy-containing acrylic resin is preferably −40° C. to 20° C., and more preferably −30° C. to 10° C. When the glass transition temperature is −40° C. or more, the coating film hardness is sufficient. When the glass transition temperature is 20° C. or less, the coating surface smoothness of the coating film is maintained.

Polyisocyanate Compound

A polyisocyanate compound is a compound having at least two isocyanate groups per molecule. Examples include aliphatic polyisocyanates, alicyclic polyisocyanates, aromatic-aliphatic polyisocyanates, aromatic polyisocyanates, derivatives of these polyisocyanates, and the like.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane; and the like.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, and methylenebis(4,1-cyclohexanediyl)diisocyanate (common name: hydrogenated MDI), and norbornane diisocyanate; alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane; and the like.

Examples of aromatic-aliphatic polyisocyanates include aromatic-aliphatic diisocyanates, such as methylenebis(4,1-phenylene)diisocyanate (common name: MDI), 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; aromatic-aliphatic triisocyanates, such as 1,3,5-triisocyanatomethylbenzene; and the like.

Examples of aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI), or 2,6-tolylene diisocyanate (common name: 2,6-TDI) or mixtures thereof, 4,4'-toluidine diisocyanate, and 4,4'-diphenylether diisocyanate; aromatic triisocyanates, such as triphenylmethane-4,4',4"-triisocyanate, 1,3,5-triisocyanatobenzene, and 2,4,6-triisocyanatotoluene; aromatic tetraisocyanates, such as 4,4'-diphenylmethane-2,2',5,5'-tetraisocyanate; and the like. Examples of polyisocyanate derivatives include dimers, trimers, biurets, allophanates, urethodiones, urethoimines, isocyanurates, oxadiazinetriones, polymethylene polyphenyl polyisocyanates (crude MDI, polymeric MDI), crude TDI, and the like, of the above-mentioned polyisocyanates.

The above polyisocyanates and derivatives thereof may be used singly or in a combination of two or more.

Among the aliphatic diisocyanates, hexamethylene diisocyanate-based compounds are preferably used, and among the alicyclic diisocyanates, 4,4'-methylenebis(cyclohexyl isocyanate) is preferably used. Of these, derivatives of hexamethylene diisocyanate are particularly the most preferable, in terms of adhesion, compatibility, and the like.

As the polyisocyanate compound, a prepolymer is also usable that is formed by reacting the polyisocyanate or a derivative thereof with a compound having active hydrogen, such as hydroxy or amino, and reactive to the polyisocyanate under conditions such that the isocyanate groups are present in excess. Examples of the compound reactive to the polyisocyanate include polyhydric alcohols, low-molecular-weight polyester resins, amine, water, and the like.

The polyisocyanate compound for use may be a blocked polyisocyanate compound in which some or all of the isocyanate groups of the above polyisocyanate or a derivative thereof are blocked with a blocking agent.

Examples of the blocking agent include phenol compounds, such as phenol, cresol, xylenol, nitrophenol, ethylphenol, hydroxydiphenyl, butylphenol, isopropylphenol, nonylphenol, octylphenol, and methyl hydroxybenzoate; lactam compounds, such as ε-caprolactam, δ-valerolactam, γ-butyrolactam, and β-propiolactam; aliphatic alcohols, such as methanol, ethanol, propyl alcohol, butyl alcohol, amyl alcohol, and lauryl alcohol; ethers, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohols, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oximes, such as formamide oxime, acetamide oxime, acetoxime, methyl ethyl ketoxime, diacetyl monoxime, benzophenone oxime, and cyclohexane oxime; active methylenes, such as dimethyl malonate, diethyl malonate, ethyl acetoacetate, methyl acetoacetate, and acetylacetone; mercaptans, such as butyl mercaptan, t-butyl mercaptan, hexyl mercaptan, t-dodecyl mercaptan, 2-mercaptobenzothiazole, thiophenol, methylthiophenol, and ethylthiophenol; acid amides, such as acetanilide, acetanisidide, acetotoluide, acrylamide, methacrylamide, acetic acid amide, stearic acid amide, and benzamide; imides, such as succinimide, phthalimide, and maleimide; amines, such as diphenylamine, phenylnaphthylamine, xylidine, N-phenylxylidine, carbazole, aniline, naphthylamine, butylamine, dibutylamine, and butylphenylamine; imidazoles, such as imidazole and 2-ethylimidazole; ureas, such as urea, thiourea, ethylene urea, ethylenethiourea, and diphenylurea; carbamate esters, such as phenyl N-phenylcarbamate; imines, such as ethyleneimine and propyleneimine; sulfites, such as sodium bisulfite and potassium bisulfite; azole-based compounds; and the like. Examples of azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline. When blocking is performed (a blocking agent is reacted), it can be performed by adding a solvent, if necessary. As the solvent used in the blocking reaction, a solvent that is not reactive with an isocyanate group is preferably used. Examples include ketones, such as acetone and methyl ethyl ketone; esters, such as ethyl acetate; N-methyl-2-pyrrolidone (NMP); and like solvents.

The polyisocyanate compounds can be used singly or in a combination of two or more.

When a two-component clear paint containing a hydroxy-containing resin and an isocyanate group-containing compound is used as the clear paint (Z), the equivalent ratio of the hydroxy groups in the hydroxy-containing resin to the isocyanate groups in the polyisocyanate compound (NCO/OH) is preferably within the range of 0.5 to 2.0, and more preferably 0.8 to 1.5, in terms of the curability, scratch resistance, and the like, of the coating film.

The clear paint (Z) may suitably contain a pigment, such as a color pigment, an effect pigment, or an extender pigment, within a range that does not impair transparency.

As the color pigment, conventionally known pigments for ink or paints can be used singly or in a combination of two or more. Among these, a black pigment can be particularly used.

As the effect pigment, conventionally known pigments can be used; in particular, interference pigments can be used.

When the clear paint (Z) contains a pigment, the amount of the pigment may be suitably determined, but is preferably 10 parts by mass or less, and more preferably 0.01 to 5 parts by mass, based on 100 parts by mass of the resin solids content in the clear paint (Z).

The form of the clear paint (Z) is not particularly limited. The clear paint (Z) is generally used as an organic solvent-based paint composition. Examples of the organic solvent used in this case include various organic solvents for paints, such as aromatic or aliphatic hydrocarbon solvents, ester solvents, ketone solvents, ether solvents, and the like. As the organic solvent used herein, the one used in the preparation of the hydroxy-containing resin may be used as is, or other organic solvents may be further suitably added.

The solids concentration of the clear paint (Z) is preferably about 30 to 70 mass %, and more preferably about 40 to 60 mass %.

The clear paint (Z) is applied to the effect coating film. The coating of the clear paint (Z) is not particularly limited, and the same method as that for the base coat paint may be used. For example, the clear paint (Z) can be applied by a coating method, such as air spray coating, airless spray coating, rotary atomization coating, or curtain coating. In these coating methods, an electrostatic charge may be applied, if necessary. Among these, rotary atomization coating using an electrostatic charge is preferable. The coating amount of the clear paint (Z) is generally preferably an amount in which the cured film thickness is about 10 to 50 μm.

Moreover, when the clear paint (Z) is applied, it is preferable to suitably adjust the viscosity of the clear paint (Z) within a viscosity range suitable for the coating method. For example, for rotary atomization coating using an electrostatic charge, it is preferable to suitably adjust the viscosity of the clear paint (Z) within a range of about 15 to 60 seconds measured by a Ford cup No. 4 viscometer at 20° C. using a solvent, such as an organic solvent.

After the clear paint (Z) is applied to form a clear coating film, for example, preheating can be performed at a temperature of about 50 to 80° C. for about 3 to 10 minutes so as to promote the vaporization of volatile components.

The clear coating film may be a single layer or two or more layers. When the clear coating film is two or more layers, the same clear paint (Z) or different clear paints (Z) may be used for the first layer and the second layer. When different clear paints (Z) are used, it is preferable to use a clear paint (Z1) containing a hydroxy-containing acrylic resin and a melamine resin as the clear paint of the first layer, and to use a clear paint (Z2) containing a hydroxy-containing acrylic resin and a polyisocyanate compound as the clear paint of the second layer, in terms of the smoothness and adhesion of the coating film to be obtained.

1-4. Step (4)

Step (4) is to heat the uncured base coating film, the uncured effect coating film, and the uncured clear coating film formed in steps (1) to (3) to simultaneously cure these three coating films. When the effect pigment dispersion (Y) does not contain a base resin or a crosslinking agent mentioned above, the effect coating film may be cured due to the transition of the resin component from the upper layer and/or the lower layer.

Heating can be performed by a known means. For example, a drying furnace, such as a hot-blast stove, an electric furnace, or an infrared beam heating furnace, can be used.

The heating temperature is suitably within the range of 70 to 150° C., and preferably 80 to 140° C.

The heating time is not particularly limited, but is preferably within the range of 10 to 40 minutes, and more preferably 20 to 30 minutes.

The above steps (1) to (4) are sequentially performed to form a multilayer coating film.

In the obtained multilayer coating film, the Y5 value in the XYZ color space is preferably 40 to 1500, more preferably 50 to 1000, and even more preferably 65 to 700; the Y5/Y45 value obtained by dividing the Y5 value by the Y45 value in XYZ color space is preferably 40 to 300, more preferably 50 to 180, and even more preferably 55 to 150; the Y110 value in the XYZ color space is preferably 0.15 to 1.5, more preferably 0.15 to 1.0, and even more preferably 0.2 to 0.5; and the HG value that expresses graininess is preferably 5 to 50, more preferably 5 to 40, and even more preferably 5 to 35.

The Y5 value in the XYZ color space represents lightness in the XYZ color space when light illuminated at an angle of 45 degrees with respect to the coating film is received at an angle of 5 degrees deviated from the specular reflection light.

The Y45 value in the XYZ color space represents lightness in the XYZ color space when light illuminated at an angle of 45 degrees with respect to the coating film is received at an angle of 45 degrees deviated from the specular reflection light.

The Y110 value in the XYZ color space represents lightness in the XYZ color space when light illuminated at an angle of 45 degrees with respect to the coating film is received at an angle of 110 degrees deviated from the specular reflection light.

In the present specification, the Y5 value, the Y45 value, and the Y110 value are measured using a multi angles spectrophotometer (trade name: "GCMS-4," produced by Murakami Color Research Laboratory).

The HG value that expresses graininess is an abbreviation for a hi-light graininess value. The HG value is a parameter of micro-brilliance obtained by microscopic observation, and indicates the graininess in the highlight (observation of the coating film from near the specular reflection light against incident light). The HG value is calculated as follows. First, the coating film is photographed with a CCD camera at a light incidence angle of 15° and a receiving angle of 0°, and the obtained digital image data (i.e., two-dimensional brilliance distribution data) is subjected to two-dimensional Fourier transformation to obtain a power spectrum image. Subsequently, only the spatial frequency area corresponding to graininess is extracted from the power spectrum image, and the obtained measurement parameter is converted to an HG value from 0 to 100 that has a linear relation with graininess.

The multilayer coating film obtained in the present invention can form a metal feeling coating film with a sharp lightness change and excellent metallic luster.

In the present invention, when the Y5 value is high, the Y5/Y45 value is high, and the Y110 value is low, this coating film can be evaluated to have a design with a sharp lightness change.

Further, in the present invention, when the Y5 value is high and the Y110 value is low, this coating film can be evaluated to have excellent metallic luster.

Moreover, in the present invention, when the HG value is low, this coating film can be evaluated to have less graininess.

2. Second Aspect

Next, the second aspect of the present invention is described.

The second aspect of the present invention is a method for forming a multilayer coating film comprising the steps of:

(5) applying a base paint (X) to a substrate to form a base coating film, (6) applying an effect pigment dispersion (Y) to the base coating film formed in step (5) to form an effect coating film, (7) applying a black transparent paint (W) to the effect coating film formed in step (6) to form a black transparent coating film, (8) applying a clear paint (Z) to the black transparent coating film formed in step (7) to form a clear coating film, and (9) heating the uncured base coating film, the uncured effect coating film, the uncured black transparent coating film, and the uncured clear coating film formed in steps (5) to (8) to thereby simultaneously cure these four coating films;

wherein the effect pigment dispersion (Y) contains water, a black pigment (A), a vapor deposition metal flake pigment (B), and a rheology control agent (C), and the black transparent paint (W) contains a black pigment (P).

2-1. Step (5)

Step (5) is the same as step (1) described above.

2-2. Step (6)

Step (6) is the same as step (2) described above.

2-3. Step (7)

Step (7) is to apply a black transparent paint (W) to the effect coating film formed in step (6) to form a black transparent coating film.

The black transparent paint (W) is a black and transparent paint. A coating film obtained by applying the black transparent paint (W) is colored black and does not hide the undercoat layer.

The present specification defines black transparency by the haze value of the coating film. The black transparent paint (W) used in the present invention is such that the haze value of a dry film with a film thickness of 35 μm obtained by applying the black transparent paint (W) is 25% or less.

In the present invention, the haze value is defined as a value calculated using the following equation based on the diffuse light transmittance (DF) and parallel light transmittance (PT) of a coating film formed and cured on a smooth PTFE plate, and peeled off from the plate. The DF and PT of the coating film are measured using a Turbidimeter COH-300A (trade name, produced by Nippon Denshoku Industries Co., Ltd.).

Equation: Haze value=$100*DF/(DF+PT)$

The black transparent paint (W) comprises a black pigment (P) as an essential component.

As the black pigment (P), conventionally known pigments for ink, paints, or plastic coloring can be used singly or in a combination of two or more. Examples include composite metal oxide pigments, black iron oxide pigments, black titanium oxide pigments, perylene black pigments, carbon black pigments, and the like; however, in terms of obtaining a multilayer coating film in black iron color, carbon black pigments are preferable. Among these, carbon black pigments having a primary particle size of 3 to 20 nm are particularly preferable, and carbon black pigments having a primary particle size of 5 to 15 nm are more preferable. Specific examples include, but are not limited to, commercial products, such as Monarch 1300 (trade name, produced by Cabot, primary particle size: 13 nm) and Raven 5000 (trade name, produced by Birla Carbon, primary particle size: 11 nm). Such commercial products can be used singly or in a combination of two or more, depending on the desired color tone.

The content of the black pigment (P) in the black transparent paint (W) is preferably within the range of 0.025 to 6 parts by mass, more preferably 0.05 to 5 parts by mass, and even more preferably 0.1 to 3.5 parts by mass, based on 100 parts by mass of the resin solids content in the black transparent paint (W), in terms of the balance between black and transparency of the coating film to be obtained.

The black transparent paint (W) may contain a resin component, in addition to the black pigment (P). The resin component can be the same as the thermosetting resin that can be used in the base paint (X) described above. The resin component is used after being dissolved or dispersed in a solvent, such as an organic solvent and/or water.

The black transparent paint (W) may further contain a color pigment other than the black pigment (P), a dye, an effect pigment, and an extender pigment.

The color pigment other than the black pigment (P) is preferably a transparent color pigment. In the present specification, the transparent color pigment refers to a pigment that has an average primary particle size of 200 nm or less and that can form a coating film having a light transmittance of 50% or more in the visible light region (a wavelength of 400 nm to 700 nm) measured using a MPS-2450 spectrophotometer (trade name, produced by Shimadzu Corporation). The coating film is obtained by applying a paint comprising 20 parts by mass of the pigment based on 100 parts by mass of the resin solids content in the paint, to a smooth PTFE plate to a cured coating film thickness of 30 µm, followed by curing and peeling. Specific examples of transparent color pigments other than the black pigment (P) include composite metal oxide pigments, such as titanium yellow; azo-based pigments, quinacridone-based pigments, diketopyrrolopyrrole-based pigments, perylene-based pigments, perinone-based pigments, benzimidazolone-based pigments, isoindoline-based pigments, isoindolinone-based pigments, metal chelate azo-based pigments, phthalocyanine-based pigments, indanthrone-based pigments, dioxazine-based pigments, indigo-based pigments, and the like. Any of these pigments can be used singly or in a combination of two or more.

As the dye, specifically, any of azo-based dyes, triphenylmethane-based dyes, and the like can be used singly or in a combination of two or more.

Examples of the effect pigment include metal flake pigments, such as aluminum flake pigments and colored aluminum flake pigments; vapor deposition metal flake pigments; interference pigments; and the like. Specific examples of the interference pigment include metal oxide-coated mica pigments, metal oxide-coated alumina flake pigments, metal oxide-coated glass flake pigments, metal oxide-coated silica flake pigments, and the like.

When the black transparent paint (W) contains an effect pigment, the content thereof is preferably within the range of 0.01 to 15 parts by mass, more preferably 0.1 to 10 parts by mass, and particularly preferably 0.5 to 5 parts by mass, based on 100 parts by mass of the resin solids content, in terms of the brilliance and chroma of the multilayer coating film.

Examples of the extender pigment include barium sulfate, barium carbonate, calcium carbonate, aluminum silicate, silica, magnesium carbonate, talc, alumina white, and the like.

When the black transparent paint (W) contains a color pigment other than the black pigment (P), a dye, an effect pigment, and an extender pigment, the total amount thereof is preferably within the range of 0.01 to 20 parts by mass, more preferably 0.05 to 10 parts by mass, and particularly preferably 0.1 to 5 parts by mass, based on 100 parts by mass of the resin solids content in the black transparent paint (W).

Further, the black transparent paint (W) may suitably contain a solvent such as water or an organic solvent, a rheology control agent, a pigment dispersant, an antisettling agent, a curing catalyst, an antifoaming agent, an antioxidant, an ultraviolet absorber, and various other additives, if necessary.

The black transparent paint (W) is prepared by mixing and dispersing the above components.

The solids content of the black transparent paint (W) during coating is preferably adjusted to 1 to 50 mass %, and more preferably 2 to 40 mass %. Further, the viscosity thereof at a temperature of 20° C. at a rotor rotational speed of 6 rpm measured by a Brookfield type viscometer is preferably adjusted within the range of 50 to 5000 mPa·s.

The black transparent coating film can be formed by applying the black transparent paint (W) by a method such as electrostatic coating, air spray coating, or airless spray coating, followed by drying and curing. The film thickness of the black transparent coating film when cured is preferably within the range of 1 to 50 µm in terms of color expression and the smoothness of the coating film, and more preferably 2 to 40 µm.

2-4. Step (8)

Step (8) is to apply a clear paint (Z) to the black transparent coating film formed in step (7) to form a clear coating film.

This step is the same as step (3) above, except that a black transparent coating film is used in place of the effect coating film as the substrate to be coated with the clear paint (Z).

2-5. Step (9)

Step (9) is to heat the uncured base coating film, the uncured effect coating film, the uncured black transparent coating film, and the uncured clear coating film formed in steps (5) to (8) to simultaneously cure these four coating films. This step is the same as step (4) above, except that the three coating films to be cured are changed to the above four coating films.

In the obtained multilayer coating film, the Y5 value in the XYZ color space is preferably 40 to 1500, more preferably 50 to 1000, and even more preferably 65 to 700; the Y5/Y45 value obtained by dividing the Y5 value by the Y45 value in the XYZ color space is preferably 40 to 300, more preferably 50 to 180, and even more preferably 55 to 150; the Y110 value in the XYZ color space is preferably 0.15 to 1.5, more preferably 0.15 to 1.0, and even more preferably 0.2 to 0.5; and the HG value that expresses graininess is preferably 5 to 50, more preferably 5 to 40, and even more preferably 5 to 35.

3. Third Aspect

Next, the third aspect of the present invention is described.

The third aspect of the present invention is a method for forming a multilayer coating film comprising the steps of:

(10) applying a base paint (X) to a substrate to form a base coating film,

(11) applying an effect pigment dispersion (Y) to the base coating film formed in step (10) to form an effect coating film,

(12) applying a clear paint (Z) to the effect coating film formed in step (11) to form a clear coating film, followed by heating,

(13) applying a black transparent paint (W) to the coating film formed in step (12) to form a black transparent coating film, and

(14) applying a clear paint (Z) to the black transparent coating film formed in step (13) to form a clear coating film, followed by heating;

wherein the effect pigment dispersion (Y) contains water, a black pigment (A), a vapor deposition metal flake pigment (B), and a rheology control agent (C), and the black transparent paint (W) contains a black pigment (P).

3-1. Step (10)

Step (10) is the same as step (1) described above.

3-2. Step (11)

Step (11) is the same as step (2) described above.

3-3. Step (12)

Step (12) is to apply a clear paint (Z) to the effect coating film formed in step (11) to form a clear coating film, followed by heating. The clear paint (Z) can be the same as the clear paint (Z) described above in the first aspect. Further, the heating step can be the same as the heating step described in step (4) above.

3-4. Step (13)

Step (13) is to apply a black transparent paint (W) to the coating film formed in step (12) to form a black transparent coating film.

The black transparent paint (W) can be the same as the black transparent paint (W) described above in the second aspect.

3-5. Step (14)

Step (14) is to apply a clear paint (Z) to the black transparent coating film formed in step (13) to form a clear coating film, followed by heating. This step is the same as step (4), except that the three coating films to be cured are changed to two layers, i.e., a black transparent coating film and a clear coating film. Further, the clear paint (Z) may be the same or different from the clear paint (Z) used in step (11).

In the obtained multilayer coating film, the Y5 value in the XYZ color space is preferably 40 to 1500, more preferably 50 to 1000, and even more preferably 65 to 700; the Y5/Y45 value obtained by dividing the Y5 value by the Y45 value in the XYZ color space is preferably 40 to 300, more preferably 50 to 180, and even more preferably 55 to 150; the Y110 value in the XYZ color space is preferably 0.15 to 1.5, more preferably 0.15 to 1.0, and even more preferably 0.2 to 0.5; and the HG value that expresses graininess is preferably 5 to 50, more preferably 5 to 40, even more preferably 5 to 35.

In the present invention, a step of preheating the coating film, a step of setting the coating film (leaving the coating film for a certain time to evaporate the solvent), a step of sanding (grinding) the coating film, and the like may be suitably performed between each step.

Moreover, the present invention can employ the following structures.

Item 1. A method for forming a multilayer coating film comprising the steps of:

(1) applying a base paint (X) to a substrate to form a base coating film, (2) applying an effect pigment dispersion (Y) to the base coating film formed in step (1) to form an effect coating film, (3) applying a clear paint (Z) to the effect coating film formed in step (2) to form a clear coating film, and (4) heating the uncured base coating film, the uncured effect coating film, and the uncured clear coating film formed in steps (1) to (3) to thereby simultaneously cure these three coating films;

wherein the effect pigment dispersion (Y) contains water, a black pigment (A), a vapor deposition metal flake pigment (B), and a rheology control agent (C).

Item 2. A method for forming a multilayer coating film comprising the steps of:

(5) applying a base paint (X) to a substrate to form a base coating film, (6) applying an effect pigment dispersion (Y) to the base coating film formed in step (5) to form an effect coating film, (7) applying a black transparent paint (W) to the effect coating film formed in step (6) to form a black transparent coating film, (8) applying a clear paint (Z) to the black transparent coating film formed in step (7) to form a clear coating film, and (9) heating the uncured base coating film, the uncured effect coating film, the uncured black transparent coating film, and the uncured clear coating film formed in steps (5) to (8) to thereby simultaneously cure these four coating films;

wherein the effect pigment dispersion (Y) contains water, a black pigment (A), a vapor deposition metal flake pigment (B), and a rheology control agent (C), and the black transparent paint (W) contains a black pigment (P).

Item 3. A method for forming a multilayer coating film comprising the steps of:

(10) applying a base paint (X) to a substrate to form a base coating film,

(11) applying an effect pigment dispersion (Y) to the base coating film formed in step (10) to form an effect coating film,

(12) applying a clear paint (Z) to the effect coating film formed in step (11) to form a clear coating film, followed by heating,

(13) applying a black transparent paint (W) to the coating film formed in step (12) to form a black transparent coating film, and

(14) applying a clear paint (Z) to the black transparent coating film formed in step (13) to form a clear coating film, followed by heating;

wherein the effect pigment dispersion (Y) contains water, a black pigment (A), a vapor deposition metal flake pigment (B), and a rheology control agent (C), and the black transparent paint (W) contains a black pigment (P).

Item 4. The method for forming a multilayer coating film according to any one of Items 1 to 3, wherein the obtained multilayer coating film has:

a Y5 value of 40 to 1500, where the Y5 value represents lightness in the XYZ color space, a Y5/Y45 value of 40 to 300, where the Y5/Y45 value is obtained by dividing the Y5 value by a Y45 value, which represents lightness in the XYZ color space, and a Y110 value of 0.15 to 1.5, where the Y110 value represents lightness in the XYZ color space.

Item 5. The method for forming a multilayer coating film according to any one of Items 1 to 3, wherein the obtained multilayer coating film has:

a Y5 value of 40 to 1500, where the Y5 value represents lightness in the XYZ color space, a Y5/Y45 value of 40 to 300, where the Y5/Y45 value is obtained by dividing the Y5 value by a Y45 value, which represents lightness in the XYZ color space, a Y110 value of 0.15 to 1.5, where the Y110 value represents lightness in the XYZ color space, and an HG value of 5 to 50, where the HG value represents graininess.

Item 6. The method for forming a multilayer coating film according to any one of Items 1 to 5, wherein the base paint (X) contains:

a base resin that is an acrylic resin, a polyester resin, an epoxy resin, or a urethane resin, and a crosslinking agent that crosslinks and cures the base resin, and that is an amino resin, a polyisocyanate compound, a blocked polyisocyanate compound, an epoxy-containing compound, a carboxy-containing compound, a carbodiimide group-containing compound, a hydrazide group-containing compound, or a semicarbazide group-containing compound.

Item 7. The method for forming a multilayer coating film according to Item 6, wherein the proportion of the base resin and the crosslinking agent in the base paint (X) is 60 to 90 mass % of the base resin and 10 to 40 mass % of the crosslinking agent.

Item 8. The method for forming a multilayer coating film according to any one of Items 1 to 7, wherein the black pigment (A) contains a composite metal oxide pigment, a black iron oxide pigment, a black titanium oxide pigment, a perylene black pigment, or a carbon black pigment.

Item 9. The method for forming a multilayer coating film according to any one of Items 1 to 8, wherein the vapor deposition metal flake pigment (B) contains a vapor deposition aluminum flake pigment or a vapor deposition chromium flake pigment.

Item 10. The method for forming a multilayer coating film according to any one of Items 1 to 9, wherein the rheology control agent (C) contains a mineral-based rheology control agent, a polyacrylic acid-based rheology control agent, or a cellulose-based rheology control agent.

Item 11. The method for forming a multilayer coating film according to any one of Items 1 to 10, wherein the effect coating film has a dry film thickness of 0.02 to 6.5 μm.

Item 12. The method for forming a multilayer coating film according to any one of Items 1 to 11, wherein the contents of the black pigment (A) and the vapor deposition metal flake pigment (B) in the effect pigment dispersion (Y) are such that the content of the black pigment (A) is 0.01 to 20 parts by mass, and the content of the vapor deposition metal flake pigment (B) is 0.01 to 10 parts by mass, based on 100 parts by mass of the total amount of water, the black pigment (A), the vapor deposition metal flake pigment (B), and the rheology control agent (C).

Item 13. The method for forming a multilayer coating film according to any one of Items 1 to 12, wherein the content of the rheology control agent (C) in the effect pigment dispersion (Y) is 0.1 to 30 parts by mass based on 100 parts by mass of the total amount of water, the black pigment (A), the vapor deposition metal flake pigment (B), and the rheology control agent (C).

Item 14. The method for forming a multilayer coating film according to any one of Items 1 to 12, wherein the effect pigment dispersion (Y) further contains a surface adjusting agent.

Item 15. The method for forming a multilayer coating film according to Item 14, wherein the content of the surface adjusting agent in the effect pigment dispersion (Y) is 0.1 to 10 parts by mass based on 100 parts by mass of the total amount of water, the black pigment (A), the vapor deposition metal flake pigment (B), and the rheology control agent (C).

Item 16. The method for forming a multilayer coating film according to any one of Items 1 to 15, wherein the effect pigment dispersion (Y) has a viscosity of 60 to 1500 mPa·s measured using a Brookfield type viscometer at a rotor rotational speed of 60 rpm at a temperature of 20° C.

Item 17. A multilayer coating film comprising:

a base coating film formed from a base paint (X), an effect coating film formed from an effect pigment dispersion (Y) on the base coating film, and a clear coating film formed from a clear paint (Z) on the effect coating film, wherein the effect pigment dispersion (Y) contains water, a black pigment (A), a vapor deposition metal flake pigment (B), and a rheology control agent (C).

Item 18. The multilayer coating film according to Item 17, wherein the base coating film, the effect coating film, and the clear coating film are simultaneously cured.

Item 19. The multilayer coating film according to Item 17, further comprising a black transparent coating film formed from a black transparent paint (W) containing a black pigment (P) between the effect coating film and the clear coating film.

Item 20. The multilayer coating film according to Item 19, wherein the base coating film, the effect coating film, the clear coating film, and the black transparent coating film are simultaneously cured.

Item 21. The multilayer coating film according to Item 17, further comprising:

a black transparent coating film formed from a black transparent paint (W) containing a black pigment (P) on the clear coating film, and a clear coating film formed from a clear paint (Z) on the black transparent coating film.

Item 22. The multilayer coating film according to any one of Items 17 to 21, wherein the obtained multilayer coating film has:

a Y5 value of 40 to 1500, where the Y5 value represents lightness in the XYZ color space, a Y5/Y45 value of 40 to 300, where the Y5/Y45 value is obtained by dividing the Y5 value by a Y45 value, which represents lightness in the XYZ color space, and a Y110 value of 0.15 to 1.5, where the Y110 value represents lightness in the XYZ color space.

Item 23. The multilayer coating film according to any one of Items 17 to 21, wherein the obtained multilayer coating film has:
a Y5 value of 40 to 1500, where the Y5 value represents lightness in the XYZ color space,
a Y5/Y45 value of 40 to 300, where the Y5/Y45 value is obtained by dividing the Y5 value by a Y45 value, which represents lightness in the XYZ color space,
a Y110 value of 0.15 to 1.5, where the Y110 value represents lightness in the XYZ color space, and an HG value of 5 to 50, where the HG value represents graininess.

Item 24. The multilayer coating film according to any one of Items 17 to 23, wherein the base paint (X) contains:
a base resin that is an acrylic resin, a polyester resin, an epoxy resin, or a urethane resin, and
a crosslinking agent that crosslinks and cures the base resin, and that is an amino resin, a polyisocyanate compound, a blocked polyisocyanate compound, an epoxy-containing compound, a carboxy-containing compound, a carbodiimide group-containing compound, a hydrazide group-containing compound, or a semicarbazide group-containing compound.

Item 25. The multilayer coating film according to Item 24, wherein the proportion of the base resin and the crosslinking agent in the base paint (X) is 60 to 90 mass % of the base resin and 10 to 40 mass % of the crosslinking agent.

Item 26. The multilayer coating film according to any one of Items 17 to 25, wherein the black pigment (A) contains a composite metal oxide pigment, a black iron oxide pigment, a black titanium oxide pigment, a perylene black pigment, or a carbon black pigment.

Item 27. The multilayer coating film according to any one of Items 17 to 26, wherein the vapor deposition metal flake pigment (B) contains a vapor deposition aluminum flake pigment or a vapor deposition chromium flake pigment.

Item 28. The multilayer coating film according to any one of Items 17 to 27, wherein the rheology control agent (C) contains a mineral-based rheology control agent, a polyacrylic acid-based rheology control agent, or a cellulose-based rheology control agent.

Item 29. The multilayer coating film according to any one of Items 17 to 28, wherein the effect coating film has a dry film thickness of 0.02 to 6.5 µm.

Item 30. The multilayer coating film according to any one of Items 17 to 29, wherein the mixing ratio of the black pigment (A) and the vapor deposition metal flake pigment (B) in the effect pigment dispersion (Y) is such that the solids content of the black pigment (A) is 0.1 to 10 parts by mass based on 1 part by mass of the vapor deposition metal flake pigment (B).

Item 31. The multilayer coating film according to any one of Items 17 to 30, wherein the vapor deposition metal flake pigment (B) is contained in an amount of 0.2 to 50 parts by mass based on the solids content of the effect pigment dispersion (Y).

Item 32. The multilayer coating film according to any one of Items 17 to 31, wherein the effect pigment dispersion (Y) further contains a surface adjusting agent.

EXAMPLES

The present invention is described in more detail below with reference to Examples and Comparative Examples. However, the present invention is not limited only to these Examples. "Part(s)" and "%" are both based on mass.

Production of Acrylic Resin

Production Example 1

35 parts of propylene glycol monopropyl ether was placed into a reaction vessel equipped with a thermometer, a thermostat, a stirrer, a reflux condenser, a nitrogen inlet tube, and a dropping funnel, and heated to 85° C. Subsequently, a mixture comprising 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propylene glycol monopropyl ether, and 2.3 parts of 2,2'-azobis(2,4-dimethylvaleronitrile) was added dropwise thereto over a period of 4 hours. After completion of the dropwise addition, the mixture was aged for 1 hour. Subsequently, a mixture of 10 parts of propylene glycol monopropyl ether and 1 part of 2,2'-azobis(2,4-dimethylvaleronitrile) was further added dropwise thereto over a period of 1 hour. After completion of the dropwise addition, the mixture was aged for 1 hour. 7.4 parts of diethanolamine was further added thereto, thereby obtaining a hydroxy-containing acrylic resin (1) solution having a solids content of 55%. The obtained hydroxy-containing acrylic resin (1) had an acid value of 47 mgKOH/g and a hydroxy value of 72 mgKOH/g.

Production of Effect Pigment Dispersion (Y)

Production Example 2

73.7 parts by mass of distilled water, 1.3 parts of "Raven 5000" (trade name, produced by BIRLA CARBON, carbon black, primary particle size: 11 nm), 2.1 parts (solids content) of acrylic resin (1), 5 parts (0.5 parts as a solids content) of "Hydroshine WS-3001" (trade name, an aqueous vapor deposition aluminum flake pigment, produced by Eckart, solids content: 10%, internal solvent: isopropanol, average particle size D50: 13 µm, thickness: 0.05 µm, the surface was treated with silica), 3 parts by mass (0.8 parts by mass as a solids content) of "Acrysol ASE-60" (a polyacrylic acid-based rheology control agent, produced by The Dow Chemical Company, solids content: 28%), 1.1 parts (solids content) of surface adjusting agent "BYK348" (trade name, produced by BYK-Chemie, a silicone-based surface adjusting agent, contact angle: 130, dynamic surface tension: 63.9 mN/m, static surface tension: 22.2 mN/m, lamellar length: 7.45 mm, non-volatile content: 100 mass %), and 0.18 parts by mass of dimethylethanolamine were stirred and mixed, thereby preparing an effect pigment dispersion (Y-1).

Production Examples 3 to 28

Effect pigment dispersions (Y-2) to (Y-27) were obtained in the same manner as in Production Example 2, except that the formulations shown in Tables 1-1 and 1-2 were used. Tables 1-1 and 1-2 show the formulations of the obtained effect pigment dispersions, together with their viscosity (B60 value).

The details of the raw materials in the tables are as follows.

"Hydroshine WS-3004," trade name, an aqueous vapor deposition aluminum flake pigment, produced by Eckart, solids content: 10%; internal solvent: isopropanol, average particle size D50: 13 pun, thickness: 0.05 µm, the surface was treated with silica.

"Metalure Liquid Black," trade name, an aqueous vapor deposition chromium flake pigment, produced by Eckart, solids content: 10%, internal solvent: propylene glycol monomethyl ether, average particle size D50: 14 μm, thickness: 0.02 μm.

"Alpaste EMR-B5690," trade name, non-leafing aluminum, produced by Toyo Aluminium K.K., average particle size D50: 8.5 μm, thickness: 0.1 μm, the surface was treated with silica.

"Alpaste EMR-B6360," trade name, non-leafing aluminum, produced by Toyo Aluminium K.K., average particle size D50: 10.3 μm, thickness: 0.19 μm, the surface was treated with silica.

"Rheocrysta," trade name, a cellulose-based rheology control agent, produced by DKS Co. Ltd., cellulose nano-fiber gel, solids content: 2%.

[Table 1]

TABLE 1

Numerical values in the table other than distilled water represent solids content.

| | | Production Example No. | | | | | | |
|---|---|---|---|---|---|---|---|---|
| | | 2 | 3 | 4 | 5 | 6 | 7 | 8 |
| Name of effect pigment dispersion (Y) | | Y-1 | Y-2 | Y-3 | Y-4 | Y-5 | Y-6 | Y-7 |
| Water | Distilled water | 73.7 | 73.2 | 76.0 | 33.0 | 65.0 | 45.0 | 79.0 |
| Black pigment (A) | Raven 5000 | 1.3 | 1.3 | 0.8 | 3.1 | 1.9 | 3.0 | 1.0 |
| Vapor deposition metal flake pigment (B) | WS-3001 | 0.5 | | | 1.3 | 0.3 | 0.3 | 0.3 |
| | WS-3004 | | 0.5 | | | | | |
| | Liquid Black | | | 1.1 | | | | 0.5 |
| Metal flake pigment other than pigment (B) | B5690 | | | | | 0.5 | | |
| | B6360 | | | | | | 1.0 | |
| Rheology control agent (C) | ASE60 | 0.8 | 0.8 | 0.9 | 0.8 | 0.8 | 0.8 | 0.8 |
| | Rheocrysta | | | | | | | |
| Surface adjusting agent | BYK348 | 1.1 | 1.1 | 1.1 | 1.0 | 1.1 | 1.1 | 1.1 |
| Resin | Acrylic resin (1) | 2.1 | 2.1 | 1.4 | 5.3 | 3.2 | 5.1 | 1.7 |
| (A)/(B) | | 2.50 | 2.50 | 0.75 | 2.50 | 2.50 | 2.50 | 1.31 |
| Paint viscosity B60/mPa·s | | 310 | 342 | 224 | 242 | 402 | 314 | 316 |

| | | Production Example No. | | | | | | |
|---|---|---|---|---|---|---|---|---|
| | | 9 | 10 | 11 | 12 | 13 | 14 | 15 |
| Name of effect pigment dispersion (Y) | | Y-8 | Y-9 | Y-10 | Y-11 | Y-12 | Y-13 | Y-14 |
| Water | Distilled water | 32.0 | 53.0 | 74.0 | 91.0 | 73.7 | 14.5 | 93.0 |
| Black pigment (A) | Raven 5000 | 3.8 | 2.5 | 0.6 | 0.13 | 1.3 | 4.8 | |
| Vapor deposition metal flake pigment (B) | WS-3001 | 0.5 | 0.5 | 0.5 | 0.5 | 0.5 | | 0.5 |
| | WS-3004 | | | | | | | |
| | Liquid Black | | | | | | | |
| Metal flake pigment other than pigment (B) | B5690 | | | | | | | |
| | B6360 | | | | | | 1.9 | |
| Rheology control agent (C) | ASE60 | 0.7 | 0.8 | 0.8 | 0.9 | | 0.8 | 0.8 |
| | Rheocrysta | | | | | 0.5 | | |
| Surface adjusting agent | BYK348 | 1.0 | 1.1 | 1.1 | 1.1 | 1.1 | 1.0 | 1.0 |
| Resin | Acrylic resin (1) | 6.4 | 4.3 | 1.1 | 0.2 | 2.1 | 8.1 | |
| (A)/(B) | | 7.50 | 5.00 | 1.25 | 0.25 | 2.50 | 2.50 | |
| Paint viscosity B60/mPa·s | | 258 | 622 | 380 | 368 | 310 | 442 | 350 |

| | | Production Example No. | | | | | | | | | | | | |
|---|---|---|---|---|---|---|---|---|---|---|---|---|---|
| | | 16 | 17 | 18 | 19 | 20 | 21 | 22 | 23 | 24 | 25 | 26 | 27 | 28 |
| Name of effect pigment dispersion (Y) | | Y-15 | Y-16 | Y-17 | Y-18 | Y-19 | Y-20 | Y-21 | Y-22 | Y-23 | Y-24 | Y-25 | Y-26 | Y-27 |
| Water | Distilled water | 74.3 | 73.8 | 76.4 | 34.6 | 65.9 | 46.5 | 79.5 | 33.9 | 54.3 | 74.3 | 91.1 | 74.3 | 14.5 |

TABLE 1-continued

Numerical values in the table other than distilled water represent solids content.

| | | | | | | | | | | | | | | |
|---|---|---|---|---|---|---|---|---|---|---|---|---|---|---|
| Black pigment (A) | Raven 5000 | 0.6 | 0.6 | 0.4 | 1.6 | 0.9 | 1.5 | 0.5 | 1.9 | 1.3 | 0.3 | 0.06 | 0.6 | 2.4 |
| Vapor deposition metal flake pigment (B) | WS-3001 | 0.5 | | | 1.3 | 0.3 | 0.3 | 0.3 | 0.5 | 0.5 | 0.5 | 0.5 | 0.5 | |
| | WS-3004 | | 0.5 | | | | | | | | | | | |
| | Liquid Black | | | 1.1 | | | | 0.5 | | | | | | |
| Metal flake pigment other than pigment (B) | B5690 | | | | | 0.5 | | | | | | | | |
| | B6360 | | | | | | 1.0 | | | | | | | 1.9 |
| Rheology control agent (C) | ASE60 | 0.8 | 0.8 | 0.9 | 0.8 | 0.8 | 0.8 | 0.8 | 0.7 | 0.8 | 0.8 | 0.9 | | 0.8 |
| | Rheocrysta | | | | | | | | | | | | 0.5 | |
| Surface adjusting agent | BYK348 | 1.1 | 1.1 | 1.1 | 1.0 | 1.1 | 1.1 | 1.1 | 1.0 | 1.1 | 1.1 | 1.1 | 1.1 | 1.0 |
| Resin | Acrylic resin (1) | 38.1 | 37.9 | 39.4 | 19.1 | 34.0 | 24.5 | 40.8 | 18.5 | 28.4 | 38.0 | 46.3 | 38.0 | 8.8 |
| (A)/(B) | | 1.3 | 1.3 | 0.8 | 2.5 | 2.5 | 2.5 | 1.3 | 7.5 | 5.0 | 1.3 | 0.3 | 2.5 | 1.3 |
| Paint viscosity B60/mPa·s | | 262 | 320 | 208 | 218 | 380 | 292 | 298 | 240 | 600 | 362 | 350 | 292 | 424 |

[Table 2]
Production of Substrate
Substrate 1

A cationic electrodeposition paint "Elecron GT-10" (trade name, produced by Kansai Paint Co., Ltd., an epoxy resin polyamine-based cationic resin containing a blocked polyisocyanate compound as a crosslinking agent) was applied by electrodeposition to a degreased and zinc phosphate-treated steel plate (JISG3141, size: 400 mm×300 mm×0.8 mm) to a film thickness of 20 μm when cured. The resulting film was heated at 170° C. for 20 minutes to be cured by crosslinking to form an electrodeposition coating film, thereby obtaining a substrate 1.

Substrate 2

A cationic electrodeposition paint "Elecron GT-10" (trade name, produced by Kansai Paint Co., Ltd., an epoxy resin polyamine-based cationic resin containing a blocked polyisocyanate compound as a crosslinking agent) was applied by electrodeposition to a degreased and zinc phosphate-treated steel plate (JISG3141, size: 400 mm×300 mm×0.8 mm) to a film thickness of 20 μm when cured. The resulting film was heated at 170° C. for 20 minutes to be cured by crosslinking to form an electrodeposition coating film.

"TP-65 No. 8110" (trade name, produced by Kansai Paint Co., Ltd., a polyester resin-based solvent-based intermediate paint, L* value of the coating film to be obtained: 20) was applied to the electrodeposition coating surface of the obtained steel plate to a cured film thickness of 20 μm by electrostatic spraying using a rotary atomization-type bell-shaped coating device. The resulting film was heated at 140° C. for 30 minutes to be cured by crosslinking to form an intermediate coating film, thereby obtaining a substrate 2.

Production of Test Plate

Example 1

A base paint (X-1) "WP-522H N-2.0" (trade name, produced by Kansai Paint Co., Ltd., a polyester resin-based aqueous intermediate paint, L* value of the coating film to be obtained: 20) was applied to the substrate 1 to a cured film thickness of 20 μm by electrostatic spraying using a rotary atomization-type bell-shaped coating device, and the resulting film was allowed to stand for 3 minutes to form a base coating film.

Further, the effect pigment dispersion (Y-1) prepared as described above was adjusted to have a paint viscosity shown in Table 1 and applied to the base coating film using a robot bell (produced by ABB) under the conditions in which the booth temperature was 23° C. and the humidity was 68% to form a 1.5-μm dry coating film. The resultant was allowed to stand for 3 minutes and then preheated at 80° C. for 3 minutes, thereby forming an effect coating film.

Subsequently, a clear paint (Z-1) "KINO6510" (trade name, produced by Kansai Paint Co., Ltd., a hydroxy/isocyanate curable acrylic resin and urethane resin-based two-component organic solvent-based paint) was applied to the effect coating film using a robot bell (produced by ABB) under the conditions in which the booth temperature was 23° C. and the humidity was 68% to form a 35-μm dry coating film, thereby forming a clear coating film. After coating, the resultant was allowed to stand at room temperature for 7 minutes, and then heated in a hot air circulation-type dryer at 140° C. for 30 minutes to simultaneously dry the multilayer coating films, thereby obtaining a test plate.

The film thickness of the dry coating film shown in Table 2 was calculated from the following formula. The same applies to the following Examples.

$$x = sc/sg/S * 10000$$

x: film thickness [μm]
sc: coating solids content [g]
sg: coating film specific gravity [g/cm$^3$]
S: evaluation area of coating solids content [cm$^2$]

Examples 2 to 17 and 19, and Comparative Examples 1 to 3

Test plates were obtained in the same manner as in Example 1, except that the substrate, paint, and film thickness shown in Table 2 were used.

The base paints (X-2) to (X-4), effect pigment dispersion (Y-28), and clear paints (Z-2) and (Z-3) in the table are as follows.

(X-2): "WP-522H N-5.0" (trade name, produced by Kansai Paint Co., Ltd., a polyester resin-based aqueous intermediate paint, L* value of the coating film to be obtained: 50).

(X-3): "WP-522H N-8.0" (trade name, produced by Kansai Paint Co., Ltd., a polyester resin-based aqueous intermediate paint, L* value of the coating film to be obtained: 80).

(X-4): "WBC-713T Enamel Clear" (trade name, produced by Kansai Paint Co., Ltd., an acrylic melamine resin-based aqueous top base coat paint for vehicles, colorless and transparent)

(Y-28): "WBC-713T 1G3" (trade name, produced by Kansai Paint Co., Ltd., an acrylic melamine resin-based aqueous top base coat paint for vehicles, gunmetal color)

(Z-2): A paint obtained by adding 0.2 parts as a solids content of "Iriodin 121 Rutile Lustre Satin" (trade name, produced by Merck, a titanium oxide-coated mica pigment) based on 100 parts by mass of the resin solids content in the above paint (Z-1).

(Z-3): "TC-69" (trade name, produced by Kansai Paint Co., Ltd., a hydroxy-containing resin/melamine resin-based one-component organic solvent-based paint).

Example 18

The base paint (X-1) was applied to the substrate 1 using a rotary atomization electrostatic coating device to a film thickness of 20 μm when cured. The resulting film was allowed to stand for 3 minutes, thereby forming a base coating film.

Further, the effect pigment dispersion (Y-1) prepared as described above was adjusted to have a paint viscosity shown in Table 2, and applied to the base coating film using a robot bell (produced by ABB) under the conditions in which the booth temperature was 23° C. and the humidity was 68% to form a 1.5-μm dry coating film. The resultant was allowed to stand for 3 minutes and then preheated at 80° C. for 3 minutes, thereby forming an effect coating film.

Then, as a first clear paint, the clear paint (Z-3) "TC-69" (trade name, produced by Kansai Paint Co., Ltd., a hydroxy-containing resin/melamine resin-based one-component organic solvent-based paint) was applied to the effect coating film using a rotary atomization electrostatic coating device to form a 35-μm cured coating film. The resultant was allowed to stand for 7 minutes and then dried by baking at 140° C. for 30 minutes, thereby obtaining a first clear coating film.

Subsequently, as a second clear paint, the clear paint (Z-1) was applied to the first clear coating film using a rotary atomization electrostatic coating device to form a 35-μm cured coating film. The resultant was allowed to stand for 7 minutes and then dried by baking at 140° C. for 30 minutes, thereby obtaining a test plate.

[Table 3]

TABLE 2

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Name of multilayer coating film | 1-1 | 1-2 | 1-3 | 1-4 | 1-5 | 1-6 | 1-7 | 1-8 | 1-9 | 1-10 | 1-11 |
| Name of substrate | 1 | 1 | 1 | 1 | 1 | 1 | 1 | 1 | 1 | 1 | 1 |
| Base paint (X) | X-1 | X-2 | X-3 | X-1 | X-1 | X-1 | X-1 | X-1 | X-1 | X-1 | X-1 |
| Effect pigment dispersion (Y) | Y-1 | Y-1 | Y-1 | Y-2 | Y-3 | Y-4 | Y-5 | Y-6 | Y-7 | Y-8 | Y-9 |
| Film thickness of (Y): μm | 1.5 | 1.5 | 1.5 | 1.5 | 1.3 | 3.0 | 2.0 | 2.9 | 1.4 | 3.1 | 2.3 |
| Clear paint (Z) | Z-1 | Z-1 | Z-1 | Z-1 | Z-1 | Z-1 | Z-1 | Z-1 | Z-1 | Z-1 | Z-1 |
| Uppermost layer clear paint | None | None | None | None | None | None | None | None | None | None | None |
| Y5 value | 232 | 242 | 240 | 179 | 86 | 91 | 95 | 67 | 120 | 48 | 83 |
| Y45 value | 1.6 | 1.6 | 1.6 | 1.5 | 1.8 | 1.6 | 1.2 | 0.7 | 1.3 | 0.7 | 1.0 |
| Y110 value | 0.3 | 0.3 | 0.3 | 0.3 | 0.3 | 0.3 | 0.2 | 0.2 | 0.2 | 0.2 | 0.2 |
| Y5/Y45 value | 148.8 | 154.4 | 155.0 | 122.4 | 48.3 | 57.5 | 78.9 | 98.9 | 92.0 | 68.3 | 87.5 |
| HG value | 30.2 | 29.0 | 28.1 | 31.0 | 15.8 | 33.9 | 26.7 | 24.0 | 29.2 | 16.3 | 31.1 |

| | Example | | | | | | | | Comparative Example | | |
|---|---|---|---|---|---|---|---|---|---|---|---|
| | 12 | 13 | 14 | 15 | 16 | 17 | 18 | 19 | 1 | 2 | 3 |
| Name of multilayer coating film | 1-12 | 1-13 | 1-14 | 1-15 | 1-16 | 1-17 | 1-18 | 1-19 | 1-20 | 1-21 | 1-22 |
| Name of substrate | 1 | 1 | 1 | 1 | 1 | 2 | 1 | 1 | 1 | 1 | 1 |
| Base paint (X) | X-1 | X-1 | X-1 | X-1 | X-1 | X-4 | X-1 | X-1 | X-1 | X-1 | X-1 |
| Effect pigment dispersion (Y) | Y-10 | Y-11 | Y-12 | Y-1 | Y-1 | Y-1 | Y-1 | Y-1 | Y-13 | Y-14 | Y-28 |
| Film thickness of (Y): μm | 1.5 | 0.7 | 0.7 | 0.7 | 6.0 | 1.5 | 1.5 | 1.5 | 4.3 | 0.7 | 15.0 |
| Clear paint (Z) | Z-1 | Z-1 | Z-1 | Z-1 | Z-1 | Z-1 | Z-3 | Z-2 | Z-1 | Z-1 | Z-1 |
| Uppermost layer clear paint | None | None | None | None | None | None | Z-1 | None | None | None | None |
| Y5 value | 214 | 663 | 262 | 180 | 82 | 228 | 245 | 222 | 32 | 1600 | 80 |
| Y45 value | 1.6 | 8.3 | 1.5 | 1.5 | 1.7 | 1.6 | 1.6 | 1.6 | 0.7 | 8.3 | 2.0 |
| Y110 value | 0.3 | 1.4 | 0.2 | 0.2 | 0.3 | 0.3 | 0.2 | 0.3 | 0.1 | 1.3 | 0.5 |
| Y5/Y45 value | 130.5 | 79.5 | 174.8 | 120.0 | 48.3 | 146.2 | 157.1 | 138.8 | 47.6 | 192.8 | 40.0 |
| HG value | 32.0 | 35.9 | 28.0 | 33.0 | 35.0 | 30.2 | 29.0 | 32.0 | 10.5 | 35.0 | 75.8 |

[Table 4]

Example 20

The base paint (X-1) "WP-522H N-2.0" (trade name, produced by Kansai Paint Co., Ltd., a polyester resin-based aqueous intermediate paint, L* value of the coating film to be obtained: 20) was applied to the substrate 1 to a cured film thickness of 20 μm by electrostatic spraying using a rotary atomization-type bell-shaped coating device. The resultant was allowed to stand for 3 minutes and then preheated at 80° C. for 3 minutes, thereby forming a base coating film.

Further, the effect pigment dispersion (Y-15) prepared as described above was adjusted to have a paint viscosity shown in Table 3, and applied to the base coating film using a robot bell (produced by ABB) under the conditions in which the booth temperature was 23° C. and the humidity was 68% to form a 1.1-μm dry coating film. The resultant was allowed to stand for 3 minutes to form an effect coating film.

Then, a black transparent paint (W-1) (a paint obtained by adding 0.2 parts as a solids content of "Raven 5000" to the base paint (X-4) based on 100 parts by mass of the resin solids content in the Enamel Clear) was applied to the effect coating film to a cured film thickness of 15 μm by electrostatic spraying using a rotary atomization-type bell-shaped coating device. The resultant was allowed to stand for 3 minutes and then preheated at 80° C. for 3 minutes, thereby forming a black transparent coating film.

Subsequently, the clear paint (Z-1) was applied to the black transparent coating film using a robot bell (produced by ABB) under the conditions in which the booth temperature was 23° C. and the humidity was 68% to form a 35-μm dry coating film, thereby forming a clear coating film. After coating, the resultant was allowed to stand at room temperature for 7 minutes, and then heated in a hot air circulation-type dryer at 140° C. for 30 minutes to simultaneously dry the multilayer coating films, thereby obtaining a test plate.

Examples 21 to 36 and 38, and Comparative Examples 4 to 6

Test plates were obtained in the same manner as in Example 20, except that the substrate, film thickness, and paint shown in Table 3 were used.

The black transparent paint (W-2) in the table is as follows.

(W-2): a paint obtained by adding 0.1 parts as a solids content of "Raven 5000" based on 100 parts by mass of the resin solids content in (Z-3).

Example 37

The base paint (X-1) was applied to the substrate 1 using a rotary atomization electrostatic coating device to a film thickness of 20 μm when cured. The resultant was allowed to stand for 3 minutes and then preheated at 80° C. for 3 minutes, thereby forming a base coating film.

Further, the effect pigment dispersion (Y-15) prepared as described above was adjusted to have a paint viscosity shown in Table 3, and applied to the base coating film using a robot bell (produced by ABB) under the conditions in which the booth temperature was 23° C. and the humidity was 68% to form a 1.1-μm dry coating film. The resultant was allowed to stand for 3 minutes to form an effect coating film.

Then, the black transparent paint (W-1) was applied to the effect coating film to a cured film thickness of 15 μm by electrostatic spraying using a rotary atomization-type bell-shaped coating device. The resultant was allowed to stand for 3 minutes and then preheated at 80° C. for 3 minutes, thereby forming a black transparent coating film.

Subsequently, the clear paint (Z-3) as a first clear paint was applied to the black transparent coating film using a rotary atomization electrostatic coating device to form a 35-μm cured coating film. The resultant was allowed to stand for 7 minutes and then dried by baking at 140° C. for 30 minutes, thereby obtaining a first clear coating film.

Thereafter, the clear paint (Z-1) as a second clear paint was applied to the first clear coating film using a rotary atomization electrostatic coating device to form a 35-μm cured coating film. The resultant was allowed to stand for 7 minutes and then dried by baking at 140° C. for 30 minutes, thereby obtaining a test plate.

[Table 5]

TABLE 3

| | Example | | | | | | | | | | |
|---|---|---|---|---|---|---|---|---|---|---|---|
| | 20 | 21 | 22 | 23 | 24 | 25 | 26 | 27 | 28 | 29 | 30 |
| Name of multilayer coating film | 2-1 | 2-2 | 2-3 | 2-4 | 2-5 | 2-6 | 2-7 | 2-8 | 2-9 | 2-10 | 2-11 |
| Name of substrate | 1 | 1 | 1 | 1 | 1 | 1 | 1 | 1 | 1 | 1 | 1 |
| Base paint (X) | X-1 | X-2 | X-3 | X-1 | X-1 | X-1 | X-1 | X-1 | X-1 | X-1 | X-1 |
| Effect pigment dispersion (Y) | Y-15 | Y-15 | Y-15 | Y-16 | Y-17 | Y-18 | Y-19 | Y-20 | Y-21 | Y-22 | Y-23 |
| Film thickness of (Y)/μm | 1.1 | 1.1 | 1.1 | 1.1 | 1.0 | 2.0 | 1.4 | 1.9 | 1.1 | 1.9 | 1.5 |
| Black transparent paint (W) | W-1 | W-1 | W-1 | W-1 | W-1 | W-1 | W-1 | W-1 | W-1 | W-1 | W-1 |
| Clear paint (Z) | Z-1 | Z-1 | Z-1 | Z-1 | Z-1 | Z-1 | Z-1 | Z-1 | Z-1 | Z-1 | Z-1 |
| Uppermost layer clear paint | None | None | None | None | None | None | None | None | None | None | None |
| Y5 value | 162 | 172 | 171 | 157 | 80 | 87 | 92 | 65 | 110 | 126 | 150 |
| Y45 value | 0.6 | 0.6 | 0.6 | 0.6 | 1.9 | 1.7 | 1.3 | 0.7 | 1.1 | 0.8 | 0.7 |
| Y110 value | 0.4 | 0.4 | 0.4 | 0.4 | 0.3 | 0.3 | 0.3 | 0.2 | 0.2 | 0.4 | 0.4 |
| Y5/Y45 value | 269.7 | 286.0 | 284.3 | 261.3 | 42.2 | 50.9 | 70.4 | 93.3 | 100.3 | 156.0 | 214.4 |
| HG value | 25.8 | 25.6 | 25.7 | 26.7 | 14.8 | 29.1 | 20.7 | 18.6 | 25.4 | 8.1 | 12.6 |

TABLE 3-continued

|  | Example | | | | | | | | Comparative Example | | |
| --- | --- | --- | --- | --- | --- | --- | --- | --- | --- | --- | --- |
|  | 31 | 32 | 33 | 34 | 35 | 36 | 37 | 38 | 4 | 5 | 6 |
| Name of multilayer coating film | 2-12 | 2-13 | 2-14 | 2-15 | 2-16 | 2-17 | 2-18 | 2-19 | 2-20 | 2-21 | 2-22 |
| Name of substrate | 1 | 1 | 1 | 1 | 2 | 1 | 1 | 1 | 1 | 1 | 1 |
| Base paint (X) | X-1 | X-1 | X-1 | X-1 | X-4 | X-1 | X-1 | X-1 | X-1 | X-1 | X-1 |
| Effect pigment dispersion (Y) | Y-24 | Y-25 | Y-15 | Y-15 | Y-15 | Y-15 | Y-15 | Y-15 | Y-27 | Y-14 | Y-28 |
| Film thickness of (Y)/μm | 1.1 | 0.7 | 0.5 | 4.3 | 1.1 | 1.1 | 1.1 | 1.1 | 2.8 | 0.7 | 15.0 |
| Black transparent paint (W) | W-1 | W-1 | W-1 | W-1 | W-1 | W-2 | W-1 | W-1 | W-1 | W-1 | W-1 |
| Clear paint (Z) | Z-1 | Z-1 | Z-1 | Z-1 | Z-1 | Z-1 | Z-3 | Z-2 | Z-1 | Z-1 | Z-1 |
| Uppermost layer clear paint | None | None | None | None | None | None | Z-1 | None | None | None | None |
| Y5 value | 204 | 214 | 157 | 80 | 160 | 162 | 171 | 159 | 25 | 1510 | 71 |
| Y45 value | 1.4 | 3.7 | 0.6 | 0.6 | 0.6 | 0.6 | 0.6 | 0.6 | 0.6 | 5.5 | 1.8 |
| Y110 value | 0.4 | 0.7 | 0.4 | 0.4 | 0.4 | 0.4 | 0.4 | 0.4 | 0.2 | 1.5 | 0.4 |
| Y5/Y45 value | 144.6 | 57.6 | 261.0 | 133.0 | 267.2 | 269.7 | 284.3 | 265.5 | 42.2 | 273.1 | 39.2 |
| HG value | 13.4 | 24.3 | 28.4 | 31.0 | 31.3 | 25.8 | 25.8 | 28.9 | 7.6 | 30.1 | 70.1 |

[Table 6]

Example 39

The base paint (X-1) was applied to the substrate 1 using a rotary atomization electrostatic coating device to a film thickness of 20 μm when cured. The resultant was allowed to stand for 3 minutes to form a base coating film.

Further, the effect pigment dispersion (Y-15) prepared as described above was adjusted to have a paint viscosity shown in Table 4, and applied to the base coating film using a robot bell (produced by ABB) under the conditions in which the booth temperature was 23° C. and the humidity was 68% to form a 1.1-μm dry coating film. The resultant was allowed to stand for 3 minutes and then preheated at 80° C. for 3 minutes, thereby forming an effect coating film.

Then, the clear paint (Z-1) was applied to the effect coating film using a rotary atomization electrostatic coating device to form a 35-μm cured coating film. The resultant was allowed to stand for 7 minutes and then dried by baking at 140° C. for 30 minutes.

Subsequently, the black transparent paint (W-1) was applied to the clear coating film to a cured film thickness of 15 μm by electrostatic spraying using a rotary atomization-type bell-shaped coating device. The resultant was allowed to stand for 3 minutes and then preheated at 80° C. for 3 minutes, thereby forming a black transparent coating film.

Thereafter, the clear paint (Z-1) was applied to the black transparent coating film using a robot bell (produced by ABB) under the conditions in which the booth temperature was 23° C. and the humidity was 68% to form a 35-μm dry coating film, thereby forming a clear coating film. After coating, the resultant was allowed to stand at room temperature for 7 minutes and then heated at 140° C. for 30 minutes to simultaneously dry the multilayer coating films, thereby obtaining a test plate.

Examples 40 to 55 and 57, and Comparative Examples 7 to 9

Test plates were obtained in the same manner as in Example 39, except that the substrate, film thickness, and paint shown in Table 4 were used.

Example 56

The base paint (X-1) was applied to the substrate 1 using a rotary atomization electrostatic coating device to a film thickness of 20 μm when cured. The resultant was allowed to stand for 3 minutes to form a base coating film.

Further, the effect pigment dispersion (Y-15) prepared as described above was adjusted to have a paint viscosity shown in Table 4, and applied to the base coating film using a robot bell (produced by ABB) under the conditions in which the booth temperature was 23° C. and the humidity was 68% to form a 1.1-μm dry coating film. The resultant was allowed to stand for 3 minutes and then preheated at 80° C. for 3 minutes, thereby forming an effect coating film.

Then, the clear paint (Z-1) was applied to the effect coating film using a rotary atomization electrostatic coating device to form a 35-μm cured coating film. The resultant was allowed to stand for 7 minutes and then dried by baking at 140° C. for 30 minutes.

Subsequently, the black transparent paint (W-1) was applied to the clear coating film to a cured film thickness of 15 μm by electrostatic spraying using a rotary atomization-type bell-shaped coating device. The resultant was allowed to stand for 3 minutes and then preheated at 80° C. for 3 minutes, thereby forming a black transparent coating film.

Thereafter, the clear paint (Z-3) was applied using a rotary atomization electrostatic coating device to form a 35-μm cured coating film. The resultant was allowed to stand for 7 minutes and then dried by baking at 140° C. for 30 minutes, thereby obtaining a first clear coating film.

Then, the clear paint (Z-1) was applied to the clear coating film using a rotary atomization electrostatic coating device to form a 35-μm cured coating film. The resultant was allowed to stand for 7 minutes and then dried by baking at 140° C. for 30 minutes, thereby obtaining a test plate.

[Table 7]

TABLE 4

|  | Example |  |  |  |  |  |  |  |  |  |  |
|---|---|---|---|---|---|---|---|---|---|---|---|
|  | 39 | 40 | 41 | 42 | 43 | 44 | 45 | 46 | 47 | 48 | 49 |
| Name of multilayer coating film | 3-1 | 3-2 | 3-3 | 3-4 | 3-5 | 3-6 | 3-7 | 3-8 | 3-9 | 3-10 | 3-11 |
| Name of substrate | 1 | 1 | 1 | 1 | 1 | 1 | 1 | 1 | 1 | 1 | 1 |
| Base paint (X) | X-1 | X-2 | X-3 | X-1 | X-1 | X-1 | X-1 | X-1 | X-1 | X-1 | X-1 |
| Effect pigment dispersion (Y) | Y-15 | Y-15 | Y-15 | Y-16 | Y-17 | Y-18 | Y-19 | Y-20 | Y-21 | Y-22 | Y-23 |
| Film thickness of (Y)/μm | 1.1 | 1.1 | 1.1 | 1.1 | 1.0 | 2.0 | 1.4 | 1.9 | 1.1 | 1.9 | 1.5 |
| Clear paint (Z) | Z-1 | Z-1 | Z-1 | Z-1 | Z-1 | Z-1 | Z-1 | Z-1 | Z-1 | Z-1 | Z-1 |
| Black transparent paint (W) | W-1 | W-1 | W-1 | W-1 | W-1 | W-1 | W-1 | W-1 | W-1 | W-1 | W-1 |
| Clear paint (Z) | Z-1 | Z-1 | Z-1 | Z-1 | Z-1 | Z-1 | Z-1 | Z-1 | Z-1 | Z-1 | Z-1 |
| Uppermost layer clear paint | None | None | None | None | None | None | None | None | None | None | None |
| Y5 value | 177 | 186 | 184 | 172 | 94 | 100 | 107 | 79 | 123 | 141 | 164 |
| Y45 value | 0.7 | 0.6 | 0.6 | 0.7 | 2.2 | 2.0 | 1.5 | 0.9 | 1.2 | 0.9 | 0.8 |
| Y110 value | 0.4 | 0.4 | 0.4 | 0.4 | 0.3 | 0.3 | 0.3 | 0.2 | 0.2 | 0.4 | 0.4 |
| Y5/Y45 value | 269.6 | 285.9 | 284.2 | 261.3 | 42.1 | 50.9 | 70.3 | 93.3 | 100.2 | 156.0 | 214.3 |
| HG value | 25.3 | 25.1 | 25.2 | 26.3 | 14.5 | 28.9 | 20.6 | 18.6 | 25.2 | 7.6 | 12.2 |

|  | Example |  |  |  |  |  |  |  | Comparative Example |  |  |
|---|---|---|---|---|---|---|---|---|---|---|---|
|  | 50 | 51 | 52 | 53 | 54 | 55 | 56 | 57 | 7 | 8 | 9 |
| Name of multilayer coating film | 3-12 | 3-13 | 3-14 | 3-15 | 3-16 | 3-17 | 3-18 | 3-19 | 3-21 | 3-22 | 3-23 |
| Name of substrate | 1 | 1 | 1 | 1 | 2 | 1 | 1 | 1 | 1 | 1 | 1 |
| Base paint (X) | X-1 | X-1 | X-1 | X-1 | X-4 | X-1 | X-1 | X-1 | X-1 | X-1 | X-1 |
| Effect pigment dispersion (Y) | Y-24 | Y-25 | Y-15 | Y-15 | Y-15 | Y-15 | Y-15 | Y-15 | Y-27 | Y-14 | Y-28 |
| Film thickness of (Y)/μm | 1.1 | 0.7 | 0.5 | 4.3 | 1.1 | 1.1 | 1.1 | 1.1 | 2.8 | 0.7 | 15.0 |
| Clear paint (Z) | Z-1 | Z-1 | Z-1 | Z-1 | Z-1 | Z-1 | Z-1 | Z-1 | Z-1 | Z-1 | Z-1 |
| Black transparent paint (W) | W-1 | W-1 | W-1 | W-1 | W-1 | W-2 | W-1 | W-1 | W-1 | W-1 | W-1 |
| Clear paint (Z) | Z-1 | Z-1 | Z-1 | Z-1 | Z-1 | Z-1 | Z-3 | Z-2 | Z-1 | Z-1 | Z-1 |
| Uppermost layer clear paint | None | None | None | None | None | None | Z-1 | None | None | None | None |
| Y5 value | 217 | 229 | 170 | 95 | 174 | 177 | 184 | 174 | 38 | 1511 | 86 |
| Y45 value | 1.5 | 4.0 | 0.7 | 0.7 | 0.7 | 0.7 | 0.6 | 0.7 | 0.9 | 5.7 | 2.2 |
| Y110 value | 0.4 | 0.7 | 0.4 | 0.4 | 0.4 | 0.4 | 0.4 | 0.4 | 0.2 | 1.7 | 0.4 |
| Y5/Y45 value | 144.6 | 57.5 | 260.9 | 133.0 | 267.1 | 269.6 | 284.3 | 265.4 | 42.2 | 95.8 | 39.2 |
| HG value | 13.1 | 24.1 | 28.3 | 31.0 | 30.8 | 25.3 | 25.4 | 28.6 | 7.5 | 30.0 | 70.0 |

[Table 8]
Evaluation of Coating Film

The coating film of each test plate obtained in the above manner was evaluated. Tables 2 to 4 show the results.

Y5 Value

The Y5 value represents lightness in the XYZ color space. This Y value is obtained by measuring light using a multi angles spectrophotometer ("GCMS-4," trade name, produced by Murakami Color Research Laboratory) in such a manner that measurement light is illuminated on the coating surface at an angle of 450 with respect to the axis perpendicular to the surface to be measured, and received at an angle of 50 deviated from the specular reflection angle in the measurement light direction. A higher Y5 value means that the highlight of the coating film is brighter.

Y45 Value

The Y45 value represents lightness in the XYZ color space. This Y value is obtained by measuring light using a multi angles spectrophotometer ("GCMS-4," trade name, produced by Murakami Color Research Laboratory) in such a manner that measurement light is illuminated on the coating surface at an angle of 45° with respect to the axis perpendicular to the surface to be measured, and received at an angle of 450 deviated from the specular reflection angle in the measurement light direction. A higher Y45 value means that the face of the coating film is brighter.

Y110 Value

The Y110 value represents lightness in the XYZ color space. This Y value is obtained by measuring light using a multi angles spectrophotometer ("GCMS-4," trade name, produced by Murakami Color Research Laboratory) in such a manner that measurement light is illuminated on the coating surface at an angle of 450 with respect to the axis perpendicular to the surface to be measured, and received at an angle of 1100 deviated from the specular reflection angle in the measurement light direction. A higher Y110 value means that the bottom of the coating film is brighter.

HG Value

The HG value is an abbreviation for a hi-light graininess value. The HG value is a parameter of microscopic brilliance obtained by the microscopic observation of a coating surface, and indicates the graininess in the highlight. The HG value is calculated as follows. First, the coating surface is photographed with a CCD camera at a light incidence angle of 15° and a receiving angle of 0°, and the obtained digital image data (two-dimensional brilliance distribution data) is subjected to two-dimensional Fourier transformation to obtain a power spectrum image. Subsequently, only the spatial frequency area corresponding to graininess is extracted from the power spectrum image, and the obtained measurement parameter is converted to a numerical value from 0 to 100 that has a linear relation with graininess, thus obtaining an HG value. An HG value of 0 indicates no graininess of the effect pigment at all, and an HG value of 100 indicates the highest possible graininess of the effect pigment.

The embodiments and Examples of the present invention are described in detail above. However, the present invention is not limited to the above-mentioned embodiments, and various modifications can be made based on the technical idea of the present invention.

For example, the structures, methods, steps, forms, materials, numerical values, and the like used in the above embodiments and Examples are merely examples, and different structures, methods, steps, forms, materials, numerical values, and the like can also be used, if necessary.

Moreover, the structures, methods, steps, forms, materials, numerical values, and the like in the above embodiments can be combined with each other, as long as the gist of the present invention is not deviated.

The invention claimed is:

1. A method for forming a multilayer coating film comprising the steps of:
   (1) applying a base paint (X) to a substrate to form a base coating film,
   (2) applying an effect pigment dispersion (Y) to the base coating film formed in step (1) to form an effect coating film, the solids content of the effect pigment dispersion (Y) during coating being 0.2 to 10 mass %, based on the effect pigment dispersion (Y),
   (3) applying a clear paint (Z) to the effect coating film formed in step (2) to form a clear coating film, and
   (4) heating the uncured base coating film, the uncured effect coating film, and the uncured clear coating film formed in steps (1) to (3) to thereby simultaneously cure these three coating films;
   wherein the effect pigment dispersion (Y) contains water, a black pigment (A), a vapor deposition metal flake pigment (B), and a rheology control agent (C)
   wherein the obtained multilayer coating film has:
   a Y5 value of 40 to 1500, where the Y5 value represents lightness in the XYZ color space,
   a Y5/Y45 value of 40 to 300, where the Y5/Y45 value is obtained by dividing the Y5 value by a Y45 value, which represents lightness in the XYZ color space,
   a Y110 value of 0.15 to 1.5, where the Y110 value represents lightness in the XYZ color space, and
   an HG value of 5 to 50, where the HG value represents graininess.

2. A method for forming a multilayer coating film comprising the steps of:
   (1) applying a base paint (X) to a substrate to form a base coating film,
   (2) applying an effect pigment dispersion (Y) to the base coating film formed in step (1) to form an effect coating film, the solids content of the effect pigment dispersion (Y) during coating being 0.2 to 10 mass %, based on the effect pigment dispersion (Y),
   (3) applying a black transparent paint (W) to the effect coating film formed in step (2) to form a black transparent coating film,
   (4) applying a clear paint (Z) to the black transparent coating film formed in step (3) to form a clear coating film, and
   (5) heating the uncured base coating film, the uncured effect coating film, the uncured black transparent coating film, and the uncured clear coating film formed in steps (1) to (4) to thereby simultaneously cure these four coating films;
   wherein the effect pigment dispersion (Y) contains water, a black pigment (A), a vapor deposition metal flake pigment (B), and a rheology control agent (C), and
   the black transparent paint (W) contains a black pigment (P),
   wherein the obtained multilayer coating film has:
   a Y5 value of 40 to 1500, where the Y5 value represents lightness in the XYZ color space,
   a Y5/Y45 value of 40 to 300, where the Y5/Y45 value is obtained by dividing the Y5 value by a Y45 value, which represents lightness in the XYZ color space,
   a Y110 value of 0.15 to 1.5, where the Y110 value represents lightness in the XYZ color space, and
   an HG value of 5 to 50, where the HG value represents graininess.

3. A method for forming a multilayer coating film comprising the steps of:
   (1) applying a base paint (X) to a substrate to form a base coating film,
   (2) applying an effect pigment dispersion (Y) to the base coating film formed in step (1) to form an effect coating film, the solids content of the effect pigment dispersion (Y) during coating being 0.2 to 10 mass %, based on the effect pigment dispersion (Y),
   (3) applying a clear paint (Z) to the effect coating film formed in step (2) to form a clear coating film, followed by heating,
   (4) applying a black transparent paint (W) to the coating film formed in step (3) to form a black transparent coating film, and
   (5) applying a clear paint (Z) to the black transparent coating film formed in step (4) to form a clear coating film, followed by heating;
   wherein the effect pigment dispersion (Y) contains water, a black pigment (A), a vapor deposition metal flake pigment (B), and a rheology control agent (C), and
   the black transparent paint (W) contains a black pigment (P),
   wherein the obtained multilayer coating film has:
   a Y5 value of 40 to 1500, where the Y5 value represents lightness in the XYZ color space,
   a Y5/Y45 value of 40 to 300, where the Y5/Y45 value is obtained by dividing the Y5 value by a Y45 value, which represents lightness in the XYZ color space,
   a Y110 value of 0.15 to 1.5, where the Y110 value represents lightness in the XYZ color space, and
   an HG value of 5 to 50, where the HG value represents graininess.

4. The method for forming a multilayer coating film according to claim 1, wherein the effect coating film has a dry film thickness of 0.02 to 6.5 µm.

5. The method for forming a multilayer coating film according to claim 4, wherein the contents of the black pigment (A) and the vapor deposition metal flake pigment (B) in the effect pigment dispersion (Y) are such that the content of the black pigment (A) is 0.01 to 20 parts by mass, and the content of the vapor deposition metal flake pigment (B) is 0.01 to 10 parts by mass, based on 100 parts by mass of the total amount of water, the black pigment (A), the vapor deposition metal flake pigment (B), and the rheology control agent (C).

6. The method for forming a multilayer coating film according to claim 5, wherein the effect pigment dispersion (Y) has a viscosity of 60 to 1500 mPa·s measured using a Brookfield type viscometer at a rotor rotational speed of 60 rpm at a temperature of 20° C.

7. The method for forming a multilayer coating film according to claim 2, wherein the effect coating film has a dry film thickness of 0.02 to 6.5 µm.

8. The method for forming a multilayer coating film according to claim 7, wherein the contents of the black pigment (A) and the vapor deposition metal flake pigment (B) in the effect pigment dispersion (Y) are such that the content of the black pigment (A) is 0.01 to 20 parts by mass, and the content of the vapor deposition metal flake pigment (B) is 0.01 to 10 parts by mass, based on 100 parts by mass of the total amount of water, the black pigment (A), the vapor deposition metal flake pigment (B), and the rheology control agent (C).

9. The method for forming a multilayer coating film according to claim 8, wherein the effect pigment dispersion (Y) has a viscosity of 60 to 1500 mPa·s measured using a Brookfield type viscometer at a rotor rotational speed of 60 rpm at a temperature of 20° C.

10. The method for forming a multilayer coating film according to claim 3, wherein the effect coating film has a dry film thickness of 0.02 to 6.5 µm.

11. The method for forming a multilayer coating film according to claim 10, wherein the contents of the black pigment (A) and the vapor deposition metal flake pigment (B) in the effect pigment dispersion (Y) are such that the content of the black pigment (A) is 0.01 to 20 parts by mass, and the content of the vapor deposition metal flake pigment (B) is 0.01 to 10 parts by mass, based on 100 parts by mass of the total amount of water, the black pigment (A), the vapor deposition metal flake pigment (B), and the rheology control agent (C).

12. The method for forming a multilayer coating film according to claim 11, wherein the effect pigment dispersion (Y) has a viscosity of 60 to 1500 mPa·s measured using a Brookfield type viscometer at a rotor rotational speed of 60 rpm at a temperature of 20° C.

13. The method for forming a multilayer coating film according to claim 1, wherein the rheology control agent (C) is at least one selected from the group consisting of a mineral-based rheology control agent, a polyacrylic acid-based rheology control agent, and a cellulose-based rheology control agent.

14. The method for forming a multilayer coating film according to claim 2, wherein the rheology control agent (C) is at least one selected from the group consisting of a mineral-based rheology control agent, a polyacrylic acid-based rheology control agent, and a cellulose-based rheology control agent.

15. The method for forming a multilayer coating film according to claim 3, wherein the rheology control agent (C) is at least one selected from the group consisting of a mineral-based rheology control agent, a polyacrylic acid-based rheology control agent, and a cellulose-based rheology control agent.

* * * * *